United States Patent
Park et al.

(10) Patent No.: US 11,546,119 B2
(45) Date of Patent: Jan. 3, 2023

(54) METHOD FOR TRANSMITTING UPLINK CONTROL INFORMATION AND APPARATUS THEREFOR

(71) Applicant: LG ELECTRONICS INC., Seoul (KR)

(72) Inventors: Hanjun Park, Seoul (KR); Suckchel Yang, Seoul (KR); Joonkui Ahn, Seoul (KR); Seungmin Lee, Seoul (KR); Daesung Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 59 days.

(21) Appl. No.: 17/317,302

(22) Filed: May 11, 2021

(65) Prior Publication Data

US 2021/0281378 A1    Sep. 9, 2021

Related U.S. Application Data

(63) Continuation of application No. 16/704,785, filed on Dec. 5, 2019, now Pat. No. 11,032,052, which is a
(Continued)

(51) Int. Cl.
*H04L 5/00*    (2006.01)
*H04L 1/16*    (2006.01)
(Continued)

(52) U.S. Cl.
CPC .......... *H04L 5/0055* (2013.01); *H04L 1/1664* (2013.01); *H04L 1/1671* (2013.01);
(Continued)

(58) Field of Classification Search
CPC .......... H04W 72/0413; H04W 72/0406; H04W 72/1284; H04W 74/002; H04W 74/004;
(Continued)

(56) References Cited

U.S. PATENT DOCUMENTS

| | | | |
|---|---|---|---|
| 9,112,694 B2 | 8/2015 | Seo et al. | |
| 9,225,448 B2 | 12/2015 | Seo et al. | |

(Continued)

FOREIGN PATENT DOCUMENTS

| | | |
|---|---|---|
| CN | 102870388 | 1/2013 |
| CN | 102934498 | 2/2013 |

(Continued)

OTHER PUBLICATIONS

Japan Patent Office Application No. 2018-235530, Final Office Action dated Jan. 27, 2020, 9 pages.
(Continued)

*Primary Examiner* — Hoang-Chuong Q Vu
(74) *Attorney, Agent, or Firm* — Lee Hong Degerman Kang Waimey

(57) ABSTRACT

A method for transmitting uplink control information and an apparatus therefor are disclosed. In a method for transmitting uplink control information using a physical uplink shared channel (PUSCH) in a wireless communication system, the method is performed by a terminal and includes receiving downlink control information including an accumulated number of physical downlink shared channels (PDSCH) transmissions associated with a cell group configured for the terminal, coding the uplink control information using the accumulated number of PDSCH transmissions, and transmitting the coded uplink control information using the PUSCH.

12 Claims, 11 Drawing Sheets

Related U.S. Application Data continuation of application No. 15/545,240, filed as application No. PCT/KR2016/000593 on Jan. 20, 2016, now Pat. No. 10,523,397.

(60) Provisional application No. 62/216,348, filed on Sep. 9, 2015, provisional application No. 62/209,314, filed on Aug. 24, 2015, provisional application No. 62/144,982, filed on Apr. 9, 2015, provisional application No. 62/115,164, filed on Feb. 12, 2015, provisional application No. 62/105,224, filed on Jan. 20, 2015.

(51) Int. Cl.
*H04L 1/18* (2006.01)
*H04W 72/04* (2009.01)
*H04L 5/14* (2006.01)

(52) U.S. Cl.
CPC .......... *H04L 1/1812* (2013.01); *H04L 1/1854* (2013.01); *H04L 1/1861* (2013.01); *H04L 1/1887* (2013.01); *H04L 5/001* (2013.01); *H04W 72/0413* (2013.01); *H04L 5/1469* (2013.01)

(58) Field of Classification Search
CPC ... H04L 5/0055; H04L 5/0048; H04L 1/1887; H04L 1/1671; H04L 1/1812; H04L 5/1469; H04L 5/001
See application file for complete search history.

(56) References Cited

U.S. PATENT DOCUMENTS

| | | | |
|---|---|---|---|
| 10,333,679 B2 | 6/2019 | Ahn et al. | |
| 10,523,397 B2 | 12/2019 | Park et al. | |
| RE48,606 E * | 6/2021 | Papasakellariou | .... H04W 72/04 |
| 2010/0165939 A1 | 7/2010 | Lin | |
| 2011/0044278 A1 | 2/2011 | Astely et al. | |
| 2011/0128922 A1 | 6/2011 | Chen et al. | |
| 2011/0280164 A1 | 11/2011 | Luo et al. | |
| 2012/0113827 A1 | 5/2012 | Yamada et al. | |
| 2012/0236812 A1 | 9/2012 | Chen et al. | |
| 2012/0281645 A1 | 11/2012 | Li et al. | |
| 2012/0320805 A1 | 12/2012 | Yang et al. | |
| 2013/0195066 A1 | 8/2013 | Lee et al. | |
| 2013/0223301 A1 | 8/2013 | Lee et al. | |
| 2013/0286905 A1 | 10/2013 | Yang et al. | |
| 2013/0301586 A1 | 11/2013 | Fan et al. | |
| 2013/0336160 A1 | 12/2013 | Yin et al. | |
| 2014/0119313 A1 | 5/2014 | Yang et al. | |
| 2014/0169242 A1 | 6/2014 | Yang et al. | |
| 2014/0198737 A1 | 7/2014 | Papasakellariou | |
| 2014/0286208 A1 | 9/2014 | Papasakellariou et al. | |
| 2014/0293893 A1 | 10/2014 | Papasakellariou et al. | |
| 2014/0307595 A1 | 10/2014 | Chen et al. | |
| 2014/0369242 A1* | 12/2014 | Ng | .......................... H04L 5/001 370/280 |
| 2014/0376421 A1 | 12/2014 | Yang et al. | |
| 2015/0003382 A1 | 1/2015 | Papasakellariou et al. | |
| 2015/0016353 A1 | 1/2015 | Lee | |
| 2015/0098441 A1 | 4/2015 | Peng | |
| 2015/0117275 A1* | 4/2015 | Park | ...................... H04L 1/1812 370/280 |
| 2015/0146588 A1 | 5/2015 | Park | |
| 2015/0155979 A1 | 6/2015 | Guo et al. | |
| 2015/0188690 A1 | 7/2015 | Khoryaev et al. | |
| 2015/0215930 A1 | 7/2015 | Kim et al. | |
| 2016/0007324 A1* | 1/2016 | Lee | .................... H04W 72/042 370/329 |
| 2016/0198450 A1 | 7/2016 | Wei et al. | |
| 2016/0198461 A1 | 7/2016 | Su | |
| 2016/0205690 A1 | 7/2016 | Berggren et al. | |
| 2016/0219577 A1 | 7/2016 | Yang et al. | |
| 2016/0295561 A1 | 10/2016 | Papasakellariou | |
| 2016/0323071 A1 | 11/2016 | Berggren et al. | |
| 2016/0344528 A1 | 11/2016 | Park | |
| 2016/0374084 A1 | 12/2016 | Zhang | |
| 2017/0094642 A1 | 3/2017 | Lee et al. | |
| 2017/0170931 A1 | 6/2017 | Kusashima et al. | |
| 2017/0366305 A1 | 12/2017 | Hwang et al. | |
| 2017/0366322 A1 | 12/2017 | Ahn et al. | |
| 2018/0006790 A1 | 1/2018 | Park et al. | |
| 2018/0006791 A1 | 1/2018 | Marinier et al. | |
| 2018/0343088 A1 | 11/2018 | Kusashima et al. | |
| 2019/0159189 A1* | 5/2019 | Wei | ........................ H04L 5/1469 |
| 2020/0112417 A1 | 4/2020 | Park et al. | |

FOREIGN PATENT DOCUMENTS

| | | |
|---|---|---|
| JP | 2014522209 | 8/2014 |
| KR | 20130113917 | 10/2013 |
| KR | 20140070526 | 6/2014 |
| WO | 2016093556 | 6/2016 |
| WO | 2016109680 | 7/2016 |
| WO | 2016115491 | 7/2016 |

OTHER PUBLICATIONS

IP Australia Application Serial No. 2016209801, Office Action dated Jul. 23, 2018, 5 pages.
United States Patent and Trademark Office U.S. Appl. No. 16/704,785, Office Action dated Nov. 13, 2020, 8 pages.
United States Patent and Trademark Office U.S. Appl. No. 16/704,785, Notice of Allowance dated Feb. 9, 2021, 10 pages.
Australian application No. 2019202687, Office Action dated Sep. 22, 2020, 7 pages.
Samsung, "HARQ-ACK overhead reduction by partial bundling", 3GPP TSG RAN WG1 Meeting #63, R1-106011, Nov. 2010, 9 pages.
NTT Docomo, et al., "Work Plan for LTE Carrier Aggregation Enhancement Beyond 5 Carriers", 3GPP TSG RAN Meeting #66, RP-141997, Dec. 2014, 6 pages.
LG Electronics, "HARQ-ACK transmission for supporting CA of up to 32 carriers", 3GPP TSG RAN WG1 Meeting #80, R1-150209, Feb. 2015, 5 pages.
Huawei, "A/N transmission in TDD CA," R1-103436, 3GPP TSG RAN WG1 Meeting #61 bis, Jul. 2010, 4 pages.
Samsung, "DAI design for LTE-A TDD", R1-104578, 3GPP TSG RAN WG1 meeting #62, Aug. 2010, 4 pages.
Japan Patent Office Application No. 2018-235530, Office Action dated Oct. 8, 2019, 8 pages.
The State Intellectual Property Office of the People's Republic of China Application Serial No. 201680006345.5, Office Action dated Oct. 9, 2019, 8 pages.
Nokia, Nokia Siemens Networks, "UL ACK/NAK Feedback for Power-Limited UE in LTE-A TDD", R1-103788, 3GPP TSG RAN WG1 Meeting #61bis, Jul. 2010, 5 pages.
Samsung, "Discussion on partial bundling methods for ACK/NACK transmission in TDD", R1-105362, 3GPP TSG RAN WG1 #62bis, Oct. 2010, 6 pages.
U.S. Appl. No. 15/545,240, Notice of Allowance dated Aug. 9, 2019, 10 pages.
U.S. Appl. No. 15/545,240, Office Action dated Apr. 18, 2019, 11 pages.
U.S. Appl. No. 15/545,240, Final Office Action dated Jan. 30, 2019, 21 pages.
U.S. Appl. No. 15/545,240, Office Action dated Jul. 27, 2018, 16 pages.
PCT International Application No. PCT/KR2016/000593, Notification of Transmittal of The International Search Report and the Written Opinion of the International Searching Authority, or Declaration dated May 24, 2016, 11 pages.
Nokia et al., "Motivation for New Wi proposal: LTE Carrier Aggregation Enhancement Beyond 5 Carriers", 3GPP TSG RAN Meeting #66, RP-142012, Dec. 2014, 4 pages.

(56) References Cited

OTHER PUBLICATIONS

IP Australia Application Serial No. 2021202971, Office Action dated Jul. 14, 2022, 7 pages.

* cited by examiner

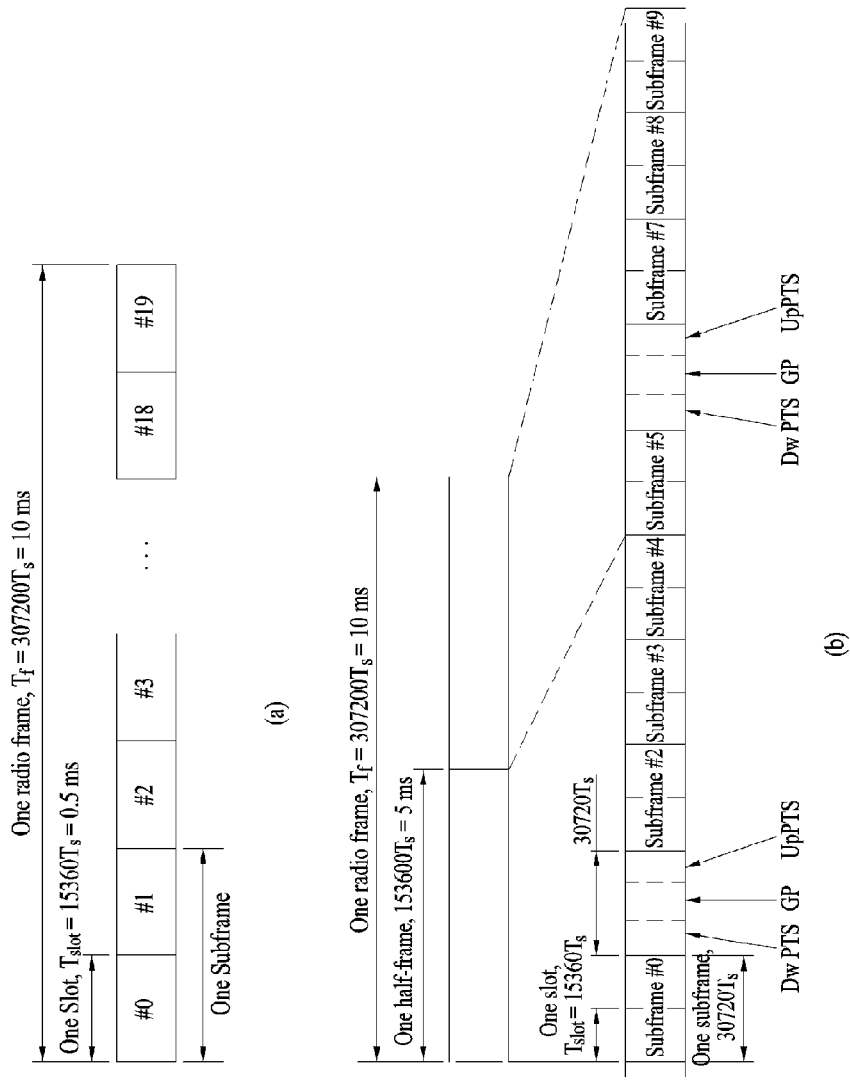
[Fig. 1]

[Fig. 2]
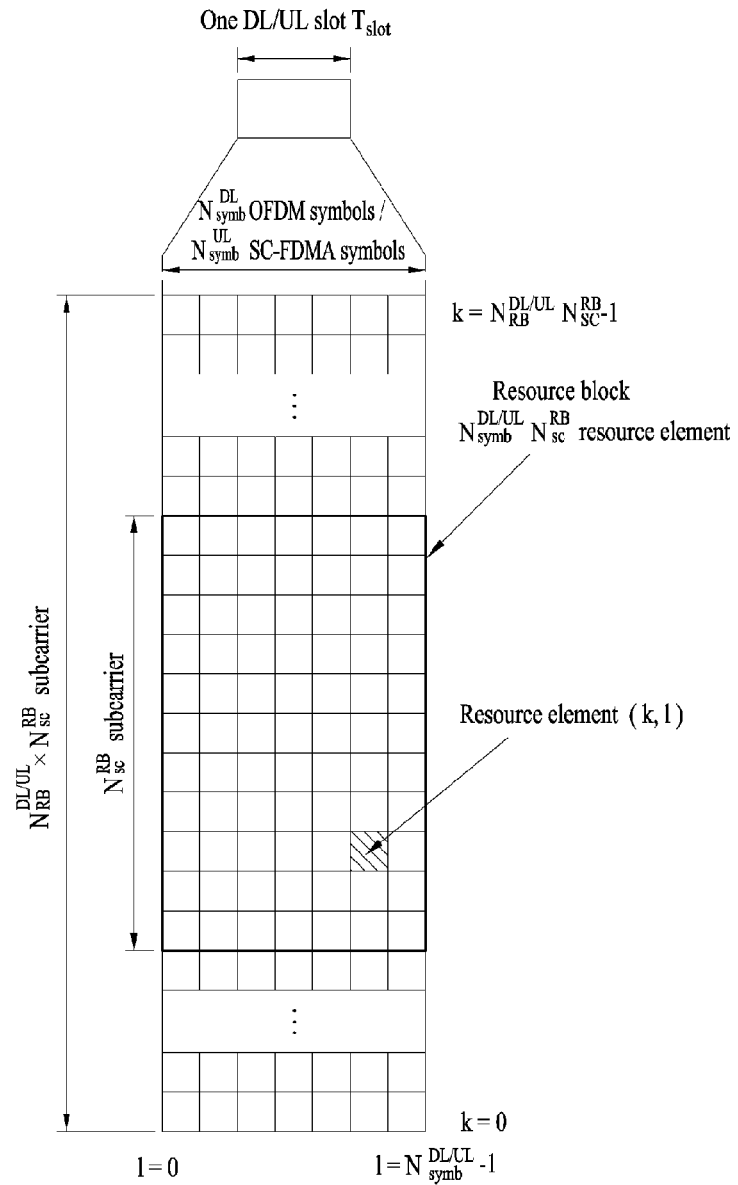

[Fig. 3]
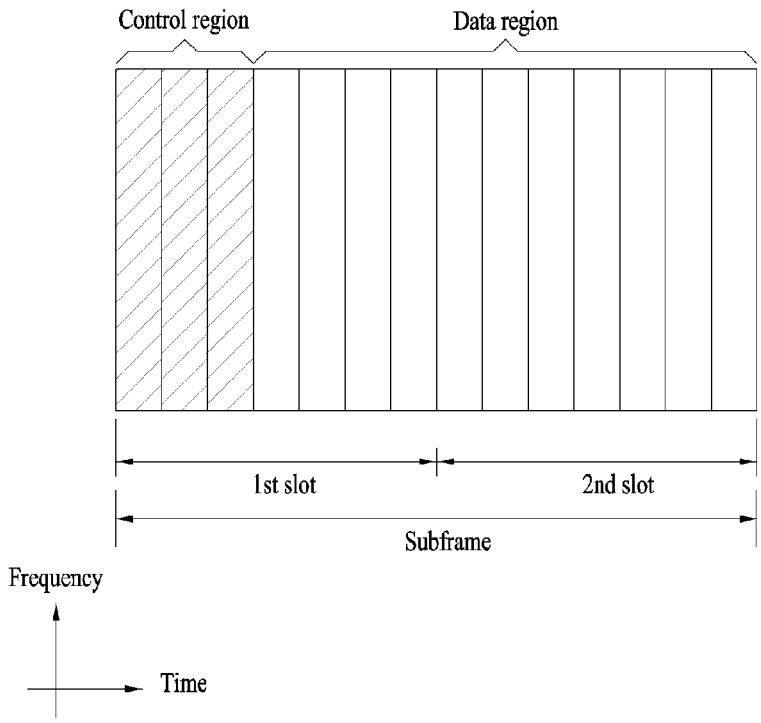
[Fig. 4]
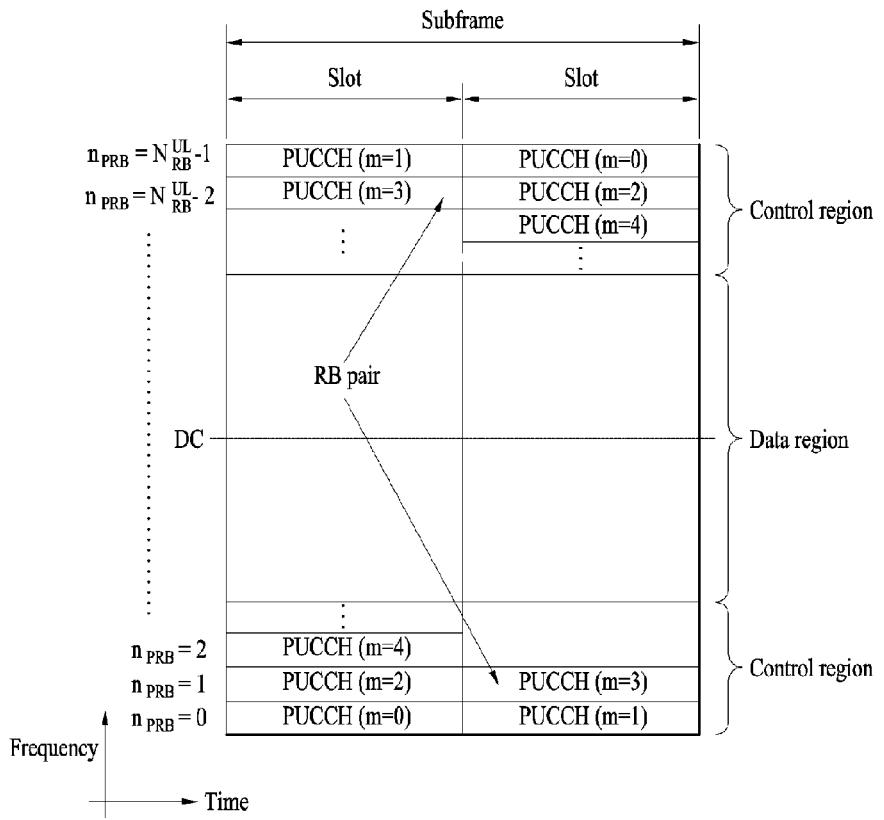

[Fig. 5]
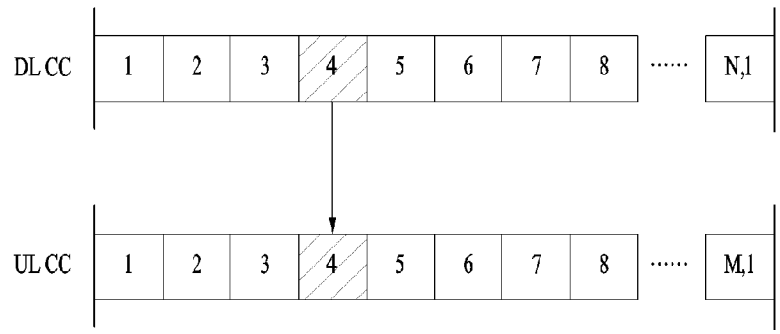
[Fig. 6]
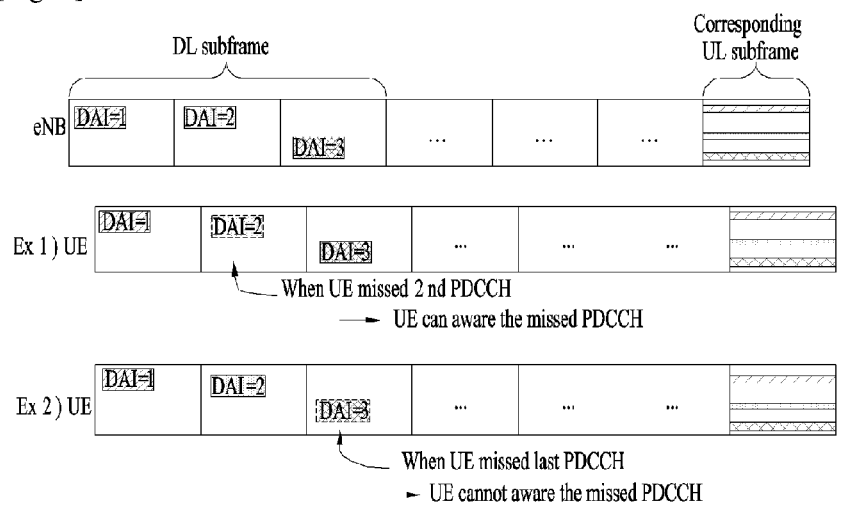
[Fig. 7]
[Fig. 8]

[Fig. 9]

Logical resource region

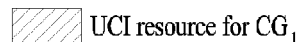

 UCI resource for CG$_1$

UCI resource for CG$_2$

[Fig. 10]

Required number of RE

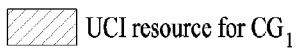

UCI resource for CG$_1$

UCI resource for CG$_2$

Logical resource region

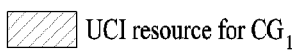

UCI resource for CG$_1$

UCI resource for CG$_2$

[Fig. 11]

Required number of RE

UCI resource for CG$_1$

UCI resource for CG$_2$

Logical resource region

UCI resource for CG$_1$  

UCI resource for CG$_2$  Punctured UCI resource for CG$_2$

[Fig. 12]
Required number of RE
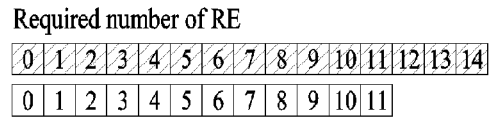
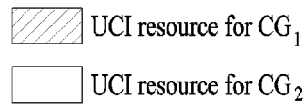
(a) Logical resource region
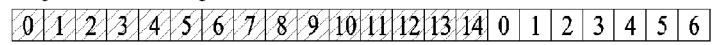
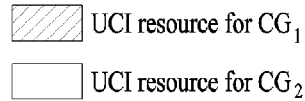
(b) Logical resource region
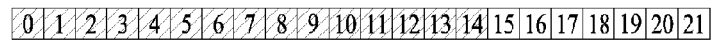
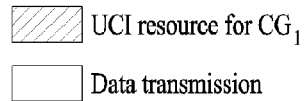
[Fig. 13]
Required number of RE
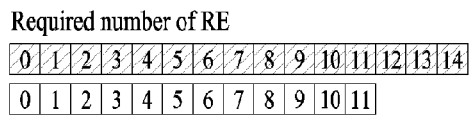
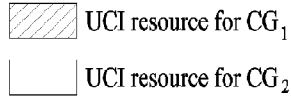
Logical resource region
Starting index for $CG_1$   Ending index for $CG_1$ Starting index for $CG_2$ Ending index for $CG_2$
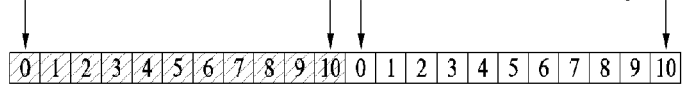
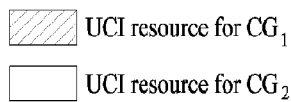

[Fig. 16]
 RI   CQI/PMI   U-SCH   RS
 A/N for CG1   A/N for CG2
[Fig. 17]
 RI   CQI/PMI   U-SCH   RS
 A/N for CG1   A/N for CG2

[Fig. 18]
| 0 | 1 | 2 | 3 | 4 | 5 | 6 | 7 | 8 | 9 | 10 | 11 |
|---|---|---|---|---|---|---|---|---|---|---|---|
| 12 | 13 | 14 | 15 | 16 | 17 | 18 | 19 | 20 | 21 | 22 | 23 |
| 24 | 25 | 26 | 27 | 28 | 29 | 30 | 31 | 32 | 33 | 34 | 35 |
| 36 | 37 | 0 | 1 | 2 | 3 | 4 | 5 | 6 | 7 | 8 | 9 |
| 10 | 11 | 12 | 13 | 14 | 15 | 16 | 17 | 18 | 19 | 20 | 21 |
| 22 | 23 | 24 | 25 | 26 | 27 | 28 | 29 | 30 | 31 | 32 | 33 |
| 34 | 25 | 36 | 37 | 38 | 39 | 40 | 41 | 42 | 43 | 44 | 45 |
| 39 | 16 | 16 | 19 | 19 | 42 | 43 | 18 | 18 | 17 | 17 | 46 |
| 46 | 47 | 48 | 49 | 50 | 51 | 52 | 53 | 54 | 55 | 56 | 57 |
| 58 | 59 | 12 | 61 | 62 | 63 | 64 | 65 | 14 | 13 | 68 | 69 |
| 70 | 71 | 8 | 11 | 74 | 75 | 76 | 77 | 10 | 9 | 80 | 81 |
| 82 | 83 | 4 | 7 | 86 | 87 | 88 | 89 | 6 | 5 | 92 | 93 |
| 94 | 95 | 0 | 3 | 98 | 99 | 100 | 101 | 2 | 1 | 104 | 105 |
| 106 | 107 | 108 | 109 | 110 | 111 | 112 | 113 | 114 | 115 | 116 | 117 |
| 118 | 119 | 120 | 121 | 122 | 123 | 124 | 125 | 126 | 127 | 128 | 129 |
| 130 | 131 | 132 | 133 | 134 | 135 | 136 | 137 | 138 | 139 | 140 | 141 |
| 142 | 143 | 144 | 145 | 146 | 147 | 148 | 149 | 150 | 151 | 152 | 153 |
| 154 | 155 | 156 | 157 | 158 | 159 | 160 | 161 | 162 | 163 | 164 | 165 |
| 166 | 24 | 167 | 168 | 169 | 170 | 171 | 26 | 172 | 173 | 25 | 174 |
| 175 | 20 | 176 | 177 | 23 | 178 | 179 | 22 | 180 | 181 | 21 | 182 |
| 183 | 16 | 184 | 185 | 19 | 186 | 187 | 18 | 188 | 189 | 17 | 190 |
| 191 | 12 | 192 | 193 | 15 | 194 | 195 | 14 | 196 | 197 | 13 | 198 |
| 199 | 8 | 200 | 11 | 11 | 202 | 203 | 10 | 10 | 9 | 9 | 206 |
| 207 | 4 | 4 | 7 | 7 | 210 | 211 | 6 | 6 | 5 | 5 | 214 |
| 215 | 0 | 0 | 3 | 3 | 74 | 219 | 2 | 2 | 1 | 1 | 222 |
 RI     CQI/PMI     U-SCH     RS
 A/N for CG1     A/N for CG2

[Fig. 19]
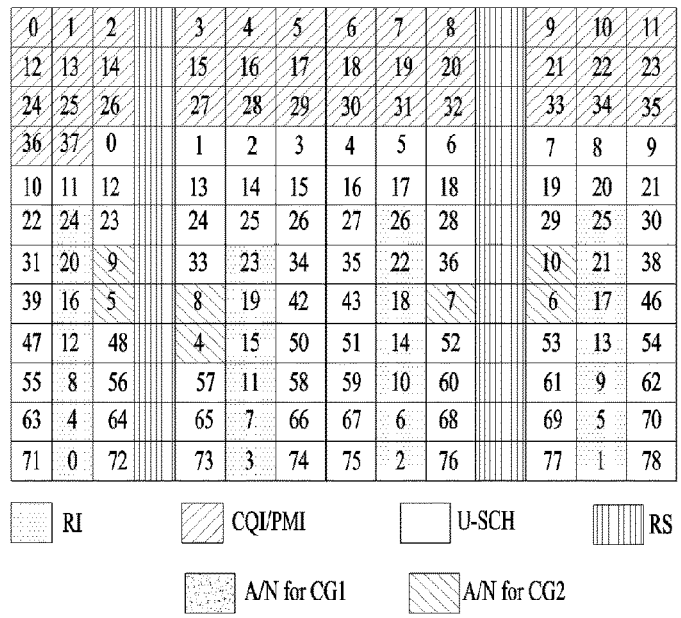
[Fig. 20]
| CIF (3bit) | 0/1A | FH / Contugous RA / Multi-clustered RA | MCS/RV (5bit) | NDI | TPC(2bit) | DM RS CS (3bit) | DAI for CG$_1$(2bit) | DAI for CG$_2$(2bit) | CQI req. (1 or bit) | SRS | RAT |
[Fig. 21]
| CIF (3bit) | 0/1A | FH / Contugous RA / Multi-clustered RA | MCS/RV (5bit) | NDI | TPC(2bit) | DM RS CS (3bit) | DAI(2bit) | CG$_1$ (1bit) | CG$_2$ (1bit) | CQI req. (1 or 2bit) | SRS | RAT |
[Fig. 22]
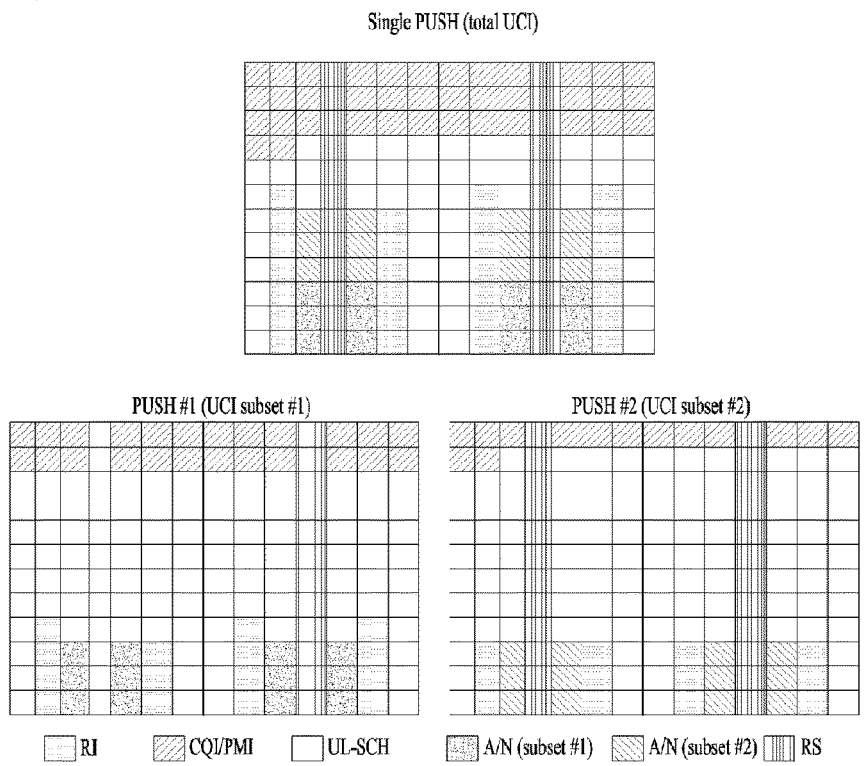

[Fig. 23]
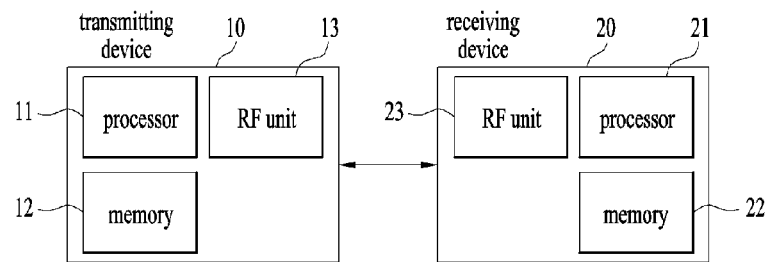

METHOD FOR TRANSMITTING UPLINK CONTROL INFORMATION AND APPARATUS THEREFOR

CROSS-REFERENCE TO RELATED APPLICATIONS

This application is a continuation of U.S. patent application Ser. No. 16/704,785, filed on Dec. 5, 2019, which is a continuation of U.S. patent application Ser. No. 15/545,240, filed on Jul. 20, 2017, now U.S. Pat. No. 10,523,397, which is the National Stage filing under 35 U.S.C. 371 of International Application No. PCT/KR2016/000593, filed on Jan. 20, 2016, which claims the benefit of U.S. Provisional Application No. 62/105,224, filed on Jan. 20, 2015, 62/115,164, filed on Feb. 12, 2015, 62/144,982, filed on Apr. 9, 2015, 62/209,314, filed on Aug. 24, 2015, and 62/216,348, filed on Sep. 9, 2015, the contents of which are all hereby incorporated by reference herein in their entirety.

TECHNICAL FIELD

The present invention relates to a wireless communication system and, more particularly, to a method for transmitting uplink control information and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station (s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF INVENTION

Technical Problem

An object of the present invention is to provide a method for transmitting uplink control information, for more efficient channel state reporting and proper scheduling according to channel state reporting.

Technical objects that can be achieved through the present invention are not limited to what has been particularly described hereinabove and other technical objects not described herein will be more clearly understood by persons skilled in the art from the following detailed description.

Solution to Problem

According to an embodiment of the present invention, provided herein is a method for transmitting uplink control information using a physical uplink shared channel (PUSCH) in a wireless communication system. The method is performed by a terminal configured with more than 5 downlink cells and includes receiving downlink control information including an accumulated number of physical downlink shared channels (PDSCH) transmissions associated with a cell group, including one or more downlink cells, configured for the terminal; coding the uplink control information using the accumulated number of PDSCH transmissions; and transmitting the coded uplink control information using the PUSCH.

Additionally or alternatively, the accumulated number of PDSCH transmissions may be accumulated up to when the downlink control information has been received.

Additionally or alternatively, the accumulated number of PDSCH transmissions may be accumulated in a time-first manner.

Additionally or alternatively, the receiving, coding, and transmitting may be performed per cell group.

Additionally or alternatively, the downlink control information may be received in a terminal-specific search space.

Additionally or alternatively, the uplink control information may include a hybrid automatic repeat request (HARQ) acknowledgement (ACK).

Additionally or alternatively, the PUSCH includes an uplink resource per cell group.

According to an embodiment of the present invention, provided herein is a terminal configured to transmit uplink control information using a physical uplink shared channel (PUSCH) in a wireless communication system, the terminal configured with more than 5 downlink cells, including a radio frequency (RF) unit and a processor configured to control the RF unit, wherein the processor is configured to receive downlink control information including an accumulated number of physical downlink shared channels (PDSCH) transmissions associated with a cell group, including one or more downlink cells, configured for the terminal, code the uplink control information using the accumulated number of PDSCH transmissions, and transmit the coded uplink control information using the PUSCH.

The above technical solutions are merely some parts of the embodiments of the present invention and various embodiments into which the technical features of the present invention are incorporated can be derived and understood by persons skilled in the art from the following detailed description of the present invention.

Advantageous Effects of Invention

According to an embodiment of the present invention, uplink control information can be efficiently transmitted.

The effects that can be achieved through the present invention are not limited to what has been particularly described hereinabove and other advantages of the present invention will be more clearly understood by persons skilled in the art from the following detailed description.

BRIEF DESCRIPTION OF DRAWINGS

The accompanying drawings, which are included to provide a further understanding of the invention, illustrate embodiments of the invention and together with the description serve to explain the principle of the invention.

FIG. 1 illustrates an exemplary radio frame used in a wireless communication system.

FIG. 2 illustrates an exemplary DL/UL slot structure in a wireless communication system.

FIG. 3 illustrates an exemplary DL subframe structure used in a 3GPP LTE/LTE-A system.

FIG. 4 illustrates an exemplary UL subframe structure used in a 3GPP LTE/LTE-A system.

FIG. 5 illustrates a link structure between DL and UL.

FIG. 6 illustrates an operation related to a DAI.

FIG. 7 illustrates an example of resource mapping of UCI.

FIG. 8 illustrates a logical resource region for UCI according to an embodiment of the present invention.

FIG. 9 illustrates exemplary UCI resource allocation for each CG according to an embodiment of the present invention.

FIG. 10 illustrates exemplary UCI resource allocation for each CG according to an embodiment of the present invention.

FIG. 11 illustrates exemplary UCI resource allocation for each CG according to an embodiment of the present invention.

FIG. 12 illustrates exemplary UCI resource allocation for each CG according to an embodiment of the present invention.

FIG. 13 illustrates exemplary UCI resource allocation for each CG according to an embodiment of the present invention.

FIG. 14 illustrates exemplary UCI resource allocation for each CG according to an embodiment of the present invention.

FIG. 15 illustrates exemplary UCI resource allocation for each CG according to an embodiment of the present invention.

FIG. 16 illustrates exemplary UCI resource allocation for each CG according to an embodiment of the present invention.

FIG. 17 illustrates exemplary UCI resource allocation for each CG according to an embodiment of the present invention.

FIG. 18 illustrates exemplary UCI resource allocation for each CG according to an embodiment of the present invention.

FIG. 19 illustrates exemplary UCI resource allocation for each CG according to an embodiment of the present invention.

FIG. 20 illustrates a DCI format according to an embodiment of the present invention.

FIG. 21 illustrates a DCI format according to an embodiment of the present invention.

FIG. 22 illustrates exemplary UCI resource mapping per physical uplink shared control channel (PUSCH) according to an embodiment of the present invention.

FIG. 23 is a block diagram of a device for implementing embodiment(s) of the present invention.

BEST MODE FOR CARRYING OUT THE INVENTION

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $*5120 \cdot T_s$ |
| 5 | $6592 \cdot T_s$ | $4384 \cdot T_s$ | $*5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |

TABLE 2-continued

|  | Normal cyclic prefix in downlink | | | Extended cyclic prefix in downlink | | |
|---|---|---|---|---|---|---|
|  |  | UpPTS | |  | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 8 | $24144 \cdot T_s$ | — | — | — | — | — |
| 9 | $13168 \cdot T_s$ | — | — | — | — | — |

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{DL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{RB}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space $S_k^{(L)}$ | | Number of PDCCH |
|---|---|---|---|
| Type | Aggregation Level L | Size[in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

FIG. 4 illustrates an exemplary uplink subframe structure used in 3GPP LTE/LTE-A. Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK orSR + ACK/NACK | One codeword |
| 1b | QPSK | 2 | ACK/NACK orSR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK orSR + ACK/NACK orCQI/ PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CST may be composed of RI, W1, W2 and CQI.

In the 3GPP LTE(-A) system, an uplink channel used for CSI transmission is shown in Table 5 below.

TABLE 5

| Scheduling Scheme | Periodic CSI transmission | Aperiodic CSI transmission |
|---|---|---|
| Frequency non-selective | PUCCH | — |
| Frequency selective | PUCCH | PUSCH |

Referring to Table 5, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI transmission via PUSCH after receiving CSI transmission request control signal.

A control signal for requesting transmission of a CSI may be included in a PUSCH scheduling control signal (UL grant) transmitted via a PDCCH signal. Table 6 below shows the mode of the UE when the CQI, the PMI and the RI are transmitted via the PUSCH.

TABLE 6

| | | PMI Feedback Type | | |
|---|---|---|---|---|
| | | No PMI | Single PMI | Multiple PMIs |
| PUSCH CQI Feedback Type | Wideband | Wideband CQI) | | Mode 1-2 RI 1st wideband CQI(4 bit) 2nd wideband CQI(4 bit) if RI > 1 N*Subband PMI(4 bit) (N is the total # of subbands)(if 8Tx Ant, N*subband W2 + wideband W1) |
| | UE selected(Subband CQI) | | Mode 2-0 RI (only for Open-loop SM) 1st wideband CQI(4 bit) + Best-M CQI(2bit) (Best-M CQI: average CQI for selected M SB(s) among N SBs) Best-M index (L bit) | Mode 2-2 RI 1st wideband CQI(4 bit) + Best-M CQI(2 bit) 2nd wideband CQI(4 bit) + Best-M CQI(2 bit) if RI > 1 Best-M index (L bit) Wideband PMI(4 bit) + Best-M PMI(4 bit) (if 8Tx Ant, wideband W2 + Best-M W2 + wideband W1) |

TABLE 6-continued

| | PMI Feedback Type | | |
|---|---|---|---|
| | No PMI | Single PMI | Multiple PMIs |
| Higher Layer-configured(Subband CQI) | Mode 3-0 RI (only for Open-loop SM) 1st wideband CQI(4 bit) + N*subbandCQI(2 bit) | Mode 3-1 RI 1st wideband CQI(4 bit) + N*subbandCQI(2 bit) 2nd wideband CQI(4 bit) + N*subbandCQI(2 bit) if RI > 1 Wideband PMI(4 bit) (if 8Tx Ant, wideband W2 + wideband W1) Ant, N*subband W2 + wideband W1) | Mode 3-2 RI 1st wideband CQI(4 bit) + N*subbandCQI(2 bit) 2nd wideband CQI(4 bit) + N*subbandCQI(2 bit) if RI > 1N*Subband PMI(4 bit) (N is the total # of subbands)(if 8Tx |

The transmission mode of Table 6 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

In Mode 3-2, the UE generate a precoding matrix for each subband instead of a single precoding matrix for system bandwidth, to be compared with Mode 3-1.

2) Periodic CQI/PMI/RI transmission via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 7 below.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

The UE may have the transmission modes shown in Table 7. Referring to Table 7, in Mode 2-0 and Mode 2-1, a bandwidth (BP) part is a set of subbands continuously located in a frequency domain and may cover a system bandwidth or a specified set S. In Table 7, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.

ii) Type 1a: A subband CQI and a second PMI are transmitted.

iii) Type 2, Type 2b, Type 2c: A wideband CQI and a PMI (WB-CQI/PMI) are transmitted.

iv) Type 2a: A wideband PMI is transmitted.

v) Type 3: An RI is transmitted.

vi) Type 4: A wideband CQI is transmitted.

vii) Type 5: An RI and a wideband PMI are transmitted.

viii) Type 6: An RI and a PTI are transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

DAI (Downlink Assignment Indicator) in LTE

FDD is a scheme of separately performing downlink (DL) and uplink (DL) transmission and reception with respect to each independent frequency band. Accordingly, when an eNB transmits a PDSCH in a DL band, a UE transmits an ACK/NACK response indicating whether complete data has been received to the eNB on a PUCCH of a UL band corresponding to the DL band after a specific time. Therefore, the DL band and the UL band operate in one-to-one correspondence.

Specifically, in an example of a legacy 3GPP LTE system, control information about DL data transmission by the eNB is transmitted to the UE on a PDCCH and the UE that has received, on a PDSCH, data scheduled through the PDCCH therefor transmits ACK/NACK on a PUCCH which is a UCI transport channel. Generally, the PUCCH for ACK/NACK transmission is not allocated to each UE in advance. Instead, a plurality of UEs dividedly uses a plurality of PUCCHs at every time point. In order for a UE that has received DL data at an arbitrary timing to transmit ACK/NACK, the UE uses a PUCCH corresponding to a PDCCH on which the UE has received scheduling information about the DL data. More specifically, a region in which a PDCCH of each DL subframe is transmitted is comprised of a plurality of control channel elements (CCEs) and a PDCCH transmitted to one UE in an arbitrary subframe is comprised of one or plural CCEs among CCEs constituting a PDCCH region of the subframe in the arbitrary subframe. In addition, resources capable of transmitting a plurality of PUCCHs are present in a region in which a PUCCH of each UL subframe is transmitted. In this case, the UE transmits ACK/NACK on a PUCCH with an index corresponding to an index of a specific (i.e., first) CCE among CCEs constituting a PDCCH that the UE has received. FIG. 5 illustrates a structure described above.

In FIG. 5, each rectangle in a DL component carrier (CC) denotes a CCE and each rectangle in a UL CC denotes a PUCCH. As illustrated in FIG. 5, if one UE acquires PDSCH related information from a PDCCH comprised of CCEs of indexes 4, 5, and 6 and receives a PDSCH, the UE transmits ACK/NACK on a PUCCH of index 4 corresponding to a CCE of index 4 which is the first CCE constituting the PDCCH.

Unlike FDD, a TDD scheme uses the same frequency band divided into a DL subframe and a UL subframe in the time domain. Accordingly, in an asymmetric data traffic situation in DL/UL, more DL subframes may be allocated or more UL subframes may be allocated. In this case, DL subframes and UL subframes may not be in one-to-one correspondence as opposed to FDD. In particular, if the number of DL subframes is greater than the number of UL subframes, a situation occurs in which an ACK/NACK response to a plurality of PDSCHs transmitted in a plurality of subframes should be processed in one subframe.

In this way, when a plurality of PDSCHs is transmitted to one UE in a plurality of DL subframes, an eNB transmits a plurality of PDCCHs one by one with respect to the PDSCHs. In this case, the UE may transmit ACK/NACK on one PUCCH through one UL subframe with respect to the received plural PDSCHs. A method of transmitting one ACK/NACK signal for a plurality of PDSCHs broadly includes two schemes as follows.

1) Bundled ACK/NACK transmission (ACK/NACK bundling): The UE transmits one ACK on one PUCCH upon successful decoding of all received PDSCHs. For the other cases, the UE transmits NACK.

2) PUCCH selective transmission: Upon receiving a plurality of PDSCHs, the UE occupies a plurality of PUCCHs capable of being used for ACK/NACK transmission using an arbitrary scheme, selects any PUCCH from among the occupied PUCCHs to transmit ACK/NACK, and transmits a plurality of ACK/NACK signals using a combination of the contents of modulation/coding on the selected PUCCH.

The above schemes cause the following problem when the UE transmits an ACK/NACK signal to the eNB.

When the UE misses part of PDCCHs transmitted by the eNB during several subframes, since the UE is not aware that PDSCHs corresponding to the missed PDCCHs has been transmitted thereto, an error may occur in generating ACK/NACK.

To solve such an error, in a TDD system, the eNB includes a DAI in a PDCCH being transmitted to indicate the counted number of PDSCHs to be transmitted on an ACK/NACK resource of one UL subframe, and informs the UE of the number of the PDSCHs. For example, when three DL subframes correspond to one UL subframe, the eNB sequentially allocates indexes to PDSCHs transmitted in the three DL subframes (i.e., the eNB sequentially counts the PDSCHs) and carries the indexes on a PDCCH for scheduling the PDSCHs and then the UE is aware of whether previous PDCCHs have been correctly received, through DAI information included in the PDCCH.

In the first example of FIG. 6, when a UE misses the second PDCCH, since a DAI of the third PDCCH, which is the last PDCCH, is different from the number of PDCCHs received until then, the UE recognizes that the second PDCCH has been missed and transmits ACK/NACK according to a recognized result. On the other hand, when the UE misses the last PDCCH as in the second example of FIG. 6, the UE cannot recognize that the last PDCCH has been missed because a previous DAI is equal to the number of PDCCHs received until then. Therefore, the UE may recognize that only two PDCCHs have been scheduled during a DL subframe. In this case, since the UE transmits ACK/NACK information through a PUCCH resource corresponding to DAI=2 rather than through a PUCCH corresponding to DAI=3, the eNB may recognize that the UE has missed a PDCCH including DAI=3.

In this case, the aforementioned DAI indicates a DL DAI and is included in DCI (e.g., a PDCCH or an EPDCCH) indicating PDSCH transmission or DL semi-persistent scheduling (SPS) release before transmission to the UE. When the eNB triggers UL transmission of the UE at an ACK/NACK transmission timing, the eNB may include a UL DAI in DCI indicating a UL grant before transmission to the UE. The UL DAI represents the accumulated number of PDCCHs/EPDCCHs indicating PDSCH transmission or SPS release for which ACK/NACK transmission is to be performed in a given duration or, in the case of carrier aggregation (CA), represents the number of DL subframes in which ACK/NACK is to be transmitted. Upon piggybacking ACK/NACK on a PUSCH through the UL DAI in the example of FIG. 6, the eNB may inform the UE of DAI=3 upon transmission of the UL grant so that the UE may recognize that the second PDCCH has been missed.

The present invention proposes a method for adaptively changing a UCI resource (or a UCI payload size), which is a resource allocated for piggybacking of UCI of CCs on a UL data channel, for example, a PUSCH, when a massive CA scheme supporting aggregation of a plurality of CCs is supported in a wireless communication system.

In an evolved wireless communication system such as a 3GPP LTE system, characteristics of information in UL are divided into UCI and data and a PUCCH, which is a channel for transmitting the UCI, and a PUSCH, which is a channel for transmitting the data, are designed according to the characteristics of information. However, in a situation in which the UE is not configured to simultaneously transmit the PUCCH and PUSCH, if PUSCH transmission is present at a timing when the UCI should be transmitted, the UE piggybacks the UCI on the PUSCH being transmitted. FIG. 7 illustrates a scheme of mapping details of UCI, that is, ACK/NACK, a rank indicator (RI), a channel quality indicator (CQI)/precoding matrix indicator (PMI), in a resource region when the UCI is transmitted on a PUSCH in a normal CP. FIG. 7 illustrates the case in which a PUSCH resource is allocated in one RB in an LTE system according to an embodiment of the present invention, wherein a horizontal axis represents a single carrier frequency division multiple access (SC-FDMA) symbol and a vertical axis represents a subcarrier. In this case, a time index of the SC-FDMA symbol increases from a left to right direction and a frequency index of the subcarrier increases from a top to down direction. In addition, different shaded regions are indicated according to types of the UCI and numbers in the same region denote mapping orders of coded symbols.

In this case, CQI/PMI is mapped without considering a resource location of ACK/NACK. Accordingly, if ACK/NACK occupies all SC-FDMA symbols, CQI/PMI in corresponding locations in FIG. 7 is punctured.

In FIG. 7, as resources to which the UCI is allocated (hereinafter, "UCI resources") in PUSCH resources occupy a high ratio, resources for transmitting data are reduced. To efficiently use resources, it is desirable that the UCI resources be allocated with a minimum amount as long as performance is guaranteed. Especially, among the types of the UCI, HARQ-ACK desirably reports ACK or NACK for a PDSCH on which actual DL scheduling has been performed, in terms of efficiency of resource utilization. However, in the above operation, if the UE judges that a corresponding transport block (TB) has not been transmitted due to detection failure of DCI although the eNB has performed DL scheduling on a specific PDSCH, HARQ-ACK configuration reported by the UE (e.g., HARQ-ACK bundling for PDSCHs detected by the UE) may be different from HARQ-ACK configuration expected by the eNB (e.g., HARQ-ACK bundling for actually transmitted PDSCHs). As an example, it is assumed that the eNB allocates two DL CCs (e.g., $CC_1$ and $CC_2$) to the UE by applying a CA scheme and the UE transmits HARQ-ACK for PDSCHs detected thereby. Then, even when the eNB transmits PDSCHs on $CC_1$ and $CC_2$, the UE may succeed in detecting the PDSCH only for $CC_2$ and report HARQ-ACK for the PDSCH transmitted on $CC_2$. Meanwhile, the eNB expects two HARQ-ACK signals for two PDSCHs and, even if the eNB recognizes the fact that only one HARQ-ACK signal has been reported, through a blind detection (BD) scheme, the eNB cannot be aware of on which CC corresponding HARQ-ACK for a PDSCH has been transmitted.

To solve such a problem, in an LTE system, the eNB configures/sets HARQ-ACK feedback (e.g., a codebook or a payload size) for all potential PDSCHs on which DL scheduling is capable of being performed for the UE and the UE transmits HARQ-ACK for all PDSCHs. Here, the case in which there is no data transmission on a specific PDSCH or the UE fails to detect the PDSCH may be defined as DTX to be reported as HARQ-ACK. In this case, DTX may be reported as one state of NACK/DTX together with NACK. As an example, when a CA scheme is applied and HARQ-ACK is transmitted on PUSCH resources in the LTE system, HARQ-ACK is designed to be reported based on PDSCHs that can be transmitted on all CCs configured by the eNB for the UE. Meanwhile, in an LTE Rel-10/11/12 system, a CA technology for transmitting DL data to the UE by combining up to 5 CCs has been considered. However, in LTE Rel-13, a massive CA scheme of expanding the number of CCs up to 32 (or 16) has been discussed for the purpose of supporting the amount of DL traffic that is rapidly increased recently. When the number of CCs which can be configured for the UE by the massive CA scheme is greatly increased, if the UE reports HARQ-ACK signals for PDSCHs that can be transmitted on all CCs configured for the UE in a UCI piggybacking procedure in PUSCH resources as in the scheme in the legacy LTE system, the ratio of UCI resources in the PUSCH resources is raised and a resource region for data transmission is reduced. In addition, as most CCs which are to be used in the massive CA scheme are predicted to be configured as resources of an unlicensed band on which PDSCH transmission is opportunistically generated according to a channel sensing result, inefficiency is expected to be much severer.

Accordingly, as methods for adaptively changing a UCI resource as needed when UCI piggybacking is performed in PUSCH resources during support of the massive CA scheme, the present invention broadly proposes (1) a method in which the UE transmits a PDSCH on a UCI resource distinguishable according to each detected CC group (CG) and (2) a method in which the eNB directly indicates a CG used for UCI piggybacking. Hereinafter, while an operation in the LTE system as a specific embodiment of the present invention will be described, the present invention is applicable to arbitrary wireless communication systems.

Separate UCI Coding/Resource Mapping for Each CG

UCI Resource for Each CG

According to a specific embodiment of the present invention, a method is proposed in which, when a UE performs UCI piggybacking on PUSCH resources, information about one or more CGs consisting of a plurality of CCs is directly signaled to the UE from an eNB or previously configured by a specific rule based on cell indexes and the number of cells and the UE derives a UCI resource for each CG by applying separate coding (e.g. a Reed-Muller (RM) code) for each CG after combining UCI corresponding to all CCs in a corresponding CG with respect to each CG. In this case, the UCI resource may indicate coded bits, a plurality of coded symbols, or a plurality of REs, for UCI transmission and a different (distinguishable) UCI resource for each CG may be configured/allocated. In the present invention, "separate coding for each CG is applied" means that an input payload of one equal encoder is not configured by a combination of UCI corresponding to a plurality of different CGs (i.e., an input payload of each encoder is configured only by UCI corresponding to one equal CG).

When the case of HARQ-ACK is considered, a UCI payload size or a UCI resource may be determined, desirably, by taking into consideration whether DL scheduling of a PDSCH that can be transmitted on each CC has been performed. Although the above scheme can allocate a flexible UCI resource, signaling overhead may increase or complexity in eNB implementation may increase in order for the UE and the eNB to recognize the flexible UCI resource. As an example, when the eNB indicates CCs on which HARQ-ACK is transmitted, the eNB may add a DAI of a CC domain to DCI for triggering PUSCH resources. That is, the DAI may indicate whether DL scheduling is performed with respect to a maximum of 32 CCs and, in this case, signaling overhead may significantly increase. Therefore, the present invention proposes a method for introducing the concept of a CG as a minimum unit capable of adaptively changing a UCI resource in terms of relief of signaling overhead and determining a UCI resource for each CG based on UCI corresponding to all CCs belonging to the CG without randomly changing the UCI resource by the UE. In the present invention, a CG may be composed of one or more cells.

Method for Separately Allocating UCI Resource for Each CG

1. Logical Resource Region

According to a specific embodiment of the present invention, a method is proposed for assigning indexes to REs of a time/frequency resource region in PUSCH resources and defining a virtual logical region according to the indexes to separately allocate a UCI resource for each CG in the logical resource region, when the UE transmits UCI corresponding to a plurality of CGs on PUSCH resources. In this case, an RE having an i-th index in the logical resource region may be determined as an RE to which an i-th coded symbol for UCI is allocated among REs of the time/frequency resource region in the PUSCH resources.

For example, in the case of HARQ-ACK, indexes 0 to 21 may be assigned to REs transmittable for HARQ-ACK in PUSCH resources in FIG. 7 and a logical resource region according to the indexes may be considered as illustrated in FIG. 8.

While indexing shown in FIG. 7 is assumed in FIG. 8, an indexing scheme between the eNB and the UE may be performed such that indexing is applied up to the number of REs which can be allocated for UCI or up to the specific number of REs configured by the eNB. In other words, the UE may configure a logical resource region for allocating the UCI resource by assuming the total number of REs which can be allocated for specific UCI in PUSCH resources or configure the logical resource region by considering the number of REs calculated under the assumption of a UCI payload size that the eNB configures through a higher layer signal etc. For example, in the case of HARQ-ACK, when one RB is allocated as the PUSCH resources as illustrated in FIG. 7, the logical resource region may be defined by assigning indexes to 48 REs corresponding to a maximum of four symbols.

1.1 Separate UCI Resource Configuration and UCI Allocation Method for Each CG in Proportion to UCI Payload Size for Each CG According to a specific embodiment of the present invention, a method is proposed for determining a UCI resource configured by Ntot REs (or Ntot coded symbols) based on Btot bits which are a UCI payload for all CGs, and defining a separate UCI resource for each CG in a manner of defining a UCI resource for a k-th CG by distributing the Ntot REs in proportion to Bk bits which are a UCI payload of the k-th CG, when the UE transmits UCI for a plurality of CGs on PUSCH resources and a logical resource region configured by ordered REs as in the above scheme is defined. That is, if a total of K CGs is present and a separate UCI resource for the k-th CG is $N_k$, a separate UCI resource for each CG satisfies a relationship of $N_0+N_1+\ldots+N_{K-1} \leq Ntot$ without having overlapping resources (e.g., REs) in the $N_{tot}$ REs.

In the case of HARQ-ACK, for example, in the LTE system according to an embodiment of the present invention, when PUSCH resources are transmitted in one TB, a UCI resource corresponding to O bits of a HARQ-ACK payload size, i.e., the number of coded symbols, Q', may be determined as follows.

[Math. 1]
$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right)$$

where
$M_{sc}^{PUSCH}$
is the number of subcarriers of an allocated PUSCH resource in the frequency domain,
$N_{symb}^{PUSCH-initial}$
is the number of SC-FDMA symbols to which the PUSCH resource is allocated, $K_r$ is the number of bits transmitted in an r-th code block,
$\beta_{offset}^{PUSCH}$
denotes a design parameter, and
∥
denotes a ceiling symbol.

Using [Math.1], the number of coded symbols, Ntot, when Btot bits, which are a UCI payload size for all CCs (or a CG), are substituted into a value of O may be calculated. When the payload size of the CG is $B_k$ bits, a UCI resource for a k-th CG may be calculated as indicated in [Math.2] by distributing Ntot REs in proportion to Bk bits which are a UCI payload size of the CG.

[Math. 2]
$$N_k = \min\left\{\left\lceil N_{tot} \frac{B_k}{B_{tot}} \right\rceil, N_{tot} - S_k\right\} \text{ where}$$

$$S_k = \sum_{l=0}^{k-1} N_l, S_0 = 0$$

In this case, UCI for each CG is generated in the form of a mother code to which a coding scheme such as RM coding is applied. If the number of bits of the mother code is less than the number of bits capable of being transmitted in the separate UCI resource, circular repetition is performed and, if the number of bits of the mother code is greater than the number of bits capable of being transmitted in the separate UCI resource, a rear part of the mother code is truncated and rate-matched so as to be transmitted on the separate UCI resource.

1.2 Ordered Allocation in Logical Resource Region

According to a specific embodiment of the present invention, a method is proposed in which the UE transmits UCI for a plurality of CGs on a PUSCH resource and a logical resource region consisting of ordered REs as in the above scheme is defined, priority information (order information) about the multiple CGs is directly signaled to the UE from the eNB or previously configured by a specific rule based on CG indexes and the UE sequentially allocates a UCI resource for each CG to the logical resource region according to priority (or order) of the CGs.

That is, a UCI resource for a CG having an (n+1)-th priority (or order) is allocated starting from the next RE of an RE to which a UCI resource for a CG having an n-th priority (or order) has been allocated. In this case, in order to allocate a UCI resource for a specific m-th CG, L REs are needed and, if the remaining number of REs through ordered allocation is less than L or if there are no remaining REs, the UE may not allocate the UCI resource for the m-th CG.

Hereinafter, in order to clearly explain an operation in the present invention, a method for deriving a UCI resource (e.g., a plurality of REs or a plurality of coded symbols or coded bits, for UCI transmission) of a specific CG will be defined using the following two methods.

First Method: After all UCI resources in PUSCH resources based on a UCI payload size of Btot bits for all CGs are derived as Ntot REs or the number of coded symbols, Ntot REs are distributed in proportion to a UCI payload size of Bk bits of a k-th CG, thereby determining a UCI resource for each CG so as not to overlap between the CGs.

(Example) The Case in which One TB is Transmitted in the LTE System

First, the number of coded symbols, $N_{tot}$, in PUSCH resources may be derived as indicated in [Math.3], based on $B_{tot}$ bits of an entire UCI payload size.

[Math. 3]

$$N_{tot} = \min\left(\left\lceil \frac{B_{tot} \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right)$$

where
$M_{sc}^{PUSCH}$
is the number of subcarriers of an allocated PUSCH resource in the frequency domain,
$N_{symb}^{PUSCH\text{-}initial}$
is the number of SC-FDMA symbols to which the PUSCH resource is allocated, $K_r$ is the number of bits transmitted in an r-th code block,
$\beta_{offset}^{PUSCH}$
denotes a design parameter, and
$\lceil\ \rceil$
denotes a ceiling symbol. Next, the number of coded symbols (or coded bits), $N_k$, for a k-th CG may be calculated as indicated in [Math.2] when a payload size of the corresponding CG is Bk bits. In this case, UCI resources for respective CGs do not have overlapped resources (e.g., coded symbols or REs) in the $N_{tot}$ coded symbols.

Second Method: A UCI resource (e.g., coded symbols or coded bits for UCI transmission) is derived based on a UCI payload size of each CG.

(Example) The case in which one TB is transmitted in the LTE system

In the second method, the number of coded symbols. $N_k$, in PUSCH resources may be derived based on a UCI payload size $B_k$ for a specific k-th CG as indicated in [Math.4].

[Math. 4]

$$N_k = \min\left(\left\lceil \frac{B_k \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right)$$

For convenience of description of the present invention, a UCI resource for each CG calculated according to First Method described above (or a UCI resource for each CG distinguished not to have overlapped resources between different CGs with respect to all UCI resources) calculated according to the above first method is referred to as "UCI resource type 1 for each CG" and a UCI resource for each CG calculated according to Second Method described above is referred to as "UCI resource type 2 for each CG".

Hereinafter, a method for mapping the UCI resource for each CG to a logical resource consisting of ordered REs will be described.

(1) Method for sequentially allocating UCI resource type 1 for each CG in a logical resource region Specifically, the present invention proposes a method for transmitting UCI for each CG as UCI resource type 1 for each CG, which does not include overlapped REs defined as in section 1.1. In this case, UCI for each CG may be generated in the form of a mother code to which a coding scheme such as RM coding is applied. If the number of bits of the mother code is less than the number of bits capable of being transmitted in UCI resource type 1, circular repetition is performed and, if the number of bits of the mother code is greater than the number of hits capable of being transmitted in UCI resource type 1, a rear part of the mother code may be truncated and rate-matched so as to be transmitted in UCI resource type 1. In this case, all UCI resources (or a logical resource region) may have a structure in which UCI resource type 1 of each CG is sequentially present according to an index or priority of the CG.

For example, it is assumed that the logical resource region as illustrated in FIGS. 7 and 8 is defined, UCI resource type 1 for CG$_1$ includes 11 REs, and UCI resource type 1 for CG$_2$ includes 11 REs. In this case, UCI resource type 1 for CG$_1$ and UCI resource type 1 for CG$_2$ may be sequentially allocated in the logical resource region as illustrated in FIG. 9.

(2) Method for allocating UCI resource type 2 for a specific CG after performing a procedure of (1)

Meanwhile, due to a restriction on maximum UCI resources capable of being allocated for UCI transmission in PUSCH resources, UCI resource type 1 for each CG may have a value less than UCI resource type 2 for each CG calculated to guarantee coding rate based on a UCI payload for each CG. In this case, if specific CG$_1$ mainly consists of CCs in a licensed band and CG$_2$ mainly consists of CCs in an unlicensed band, UCI transmission for CG$_1$ which is relatively sensitive to a HARQ process timing may be prioritized. As described in the above example, if UCI resource type 1 for a specific CG having a high priority of UCI transmission is less than UCI resource type 2, part of UCI resources for CGs having a lower priority than the specific CG may be designed to be allocated to UCI resource type 2 for a CG having a high priority. Alternatively, as in (1), all UCI resources may be divided in units of UCI resource type 1 for each CG and a CG having a high priority may generate a coded symbol based on UCI resource type 2 so that UCI resource type 1 of a CG having a lower priority may be punctured.

For example, it is assumed that UCI resource type 1 for each CG is sequentially allocated to be distinguished with respect to all UCI resources (or a logical resource region) in PUSCH resources through the procedure of (1). In this case, in a process of sequentially allocating UCI, if a priority of a CG (e.g., $CG_1$) to which n-th UCI is allocated is higher than a priority of a CG (e.g., $CG_2$) to which (n+1)-th UCI is allocated. UCI for $CG_1$ may be first allocated up to the unit of UCI resource type 1 for $CG_1$ by performing coding in units of UCI resource type 2 and the remaining part of UCI resource type 2 for $CG_1$ may be sequentially allocated stating from the front part in UCI resource type 1 for $CG_2$. In this case, UCI for $CG_2$ may be sequentially allocated after UCI resource allocation for $CG_1$ in UCI resource type 1 is ended. FIG. 10 illustrates the above example.

Alternatively, UCI for $CG_2$ in the above example is allocated by applying coding based on UCI resource type 1 for $CG_2$ as illustrated in FIG. 10 and UCI for $CG_1$ may be allocated to UCI resource type 1 for $CG_1$ by applying coding in units of UCI resource type 2 and the remaining UCI resources may be allocated in a manner of puncturing the front part of UCI resource type 1 for $CG_2$. FIG. 11 illustrates the above example.

(3) Method for sequentially allocating UCI resource type 2 for each CG in a logical resource region When priority between CGs is important, a method may be considered for sequentially allocating UCI resources in units of UCI resource type 2 for each CG in order of prioritized CGs without considering UCI resource type 1. As an example, in the case of HARQ-ACK, it is assumed that a logical resource region is defined as illustrated in FIGS. 7 and 8, UCI resource type 2 for $CG_1$ includes 15 REs, and UCI resource type 2 for $CG_2$ includes 12 REs. Then, UCI resource type 2 for $CG_1$ and UCI resource type 2 for $CG_2$ may be sequentially allocated as illustrated in (a) or (b) of FIG. 12.

In this case, (a) of FIG. 12 illustrates transmission even when UCI resources for $CG_2$ are truncated and (b) of FIG. 12 illustrates omission of UCI transmission for $CG_2$.

1.3 Starting Index and Ending Index Based Allocation in a Logical Resource Region According to a specific embodiment of the present invention, a method is proposed in which, when the UE transmits UCI for a plurality of CGs on PUSCH resources and a logical resource region consisting of sequential REs as described in the above scheme is defined, the eNB configures, for the UE, a starting index and an ending index (or a starting index and the number of allocated REs) in the logical resource region for UCI resource allocation for each CG and the UE allocates a UCI resource for each CG up to the ending index from the starting index. In this case, if the number of REs necessary for UCI resource allocation in terms of coding gain for a specific CG is greater than the number of REs allocated by the eNB, UCI resource transmission for the CG may be omitted.

For example, in the case of HARQ-ACK, it is assumed that the logical resource region is defined as illustrated in FIGS. 7 and 8, a UCI resource for $CG_1$ includes 15 REs, and a UCI resource for $CG_2$ includes 12 REs. Then, if the eNB configures the starting index and the ending index of UCI resource allocation for $CG_1$ and $CG_2$ as (0, 10) and (11, 21), respectively, UCI resources for the respective CGs may be allocated as in indicated in FIG. 13.

1.4 Starting Index and Puncturing Operation Based Allocation in Logical Resource Region According to a specific embodiment of the present invention, a method is proposed in which, when the UE transmits UCI for a plurality of CGs on PUSCH resources and a logical resource region consisting of sequential REs as in the above scheme is defined, the eNB informs the UE of priority information (or order information) for CGs and a starting index in the logical resource region for UCI resource allocation for each CG and the UE allocates UCI resources starting from a CG having a low priority (or a late order) and allocates a UCI resource for a CG having a high priority (or an early order) in a manner of puncturing the UCI resources for CG having a low priority.

Figures 14, 15:
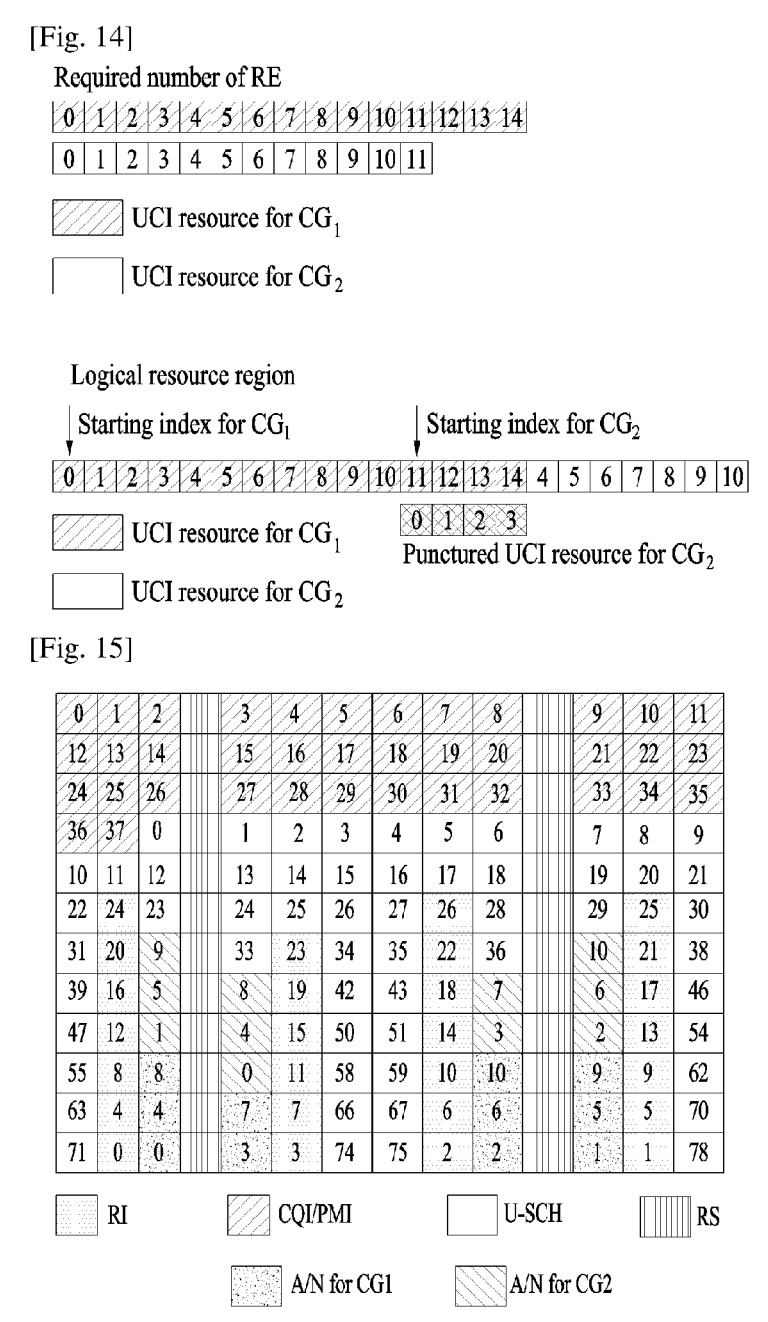

For example, in the case of HARQ-ACK, it is assumed that the logical resource region is defined as illustrated in FIG. 8, a UCI resource for $CG_1$ includes 15 REs, a UCI resource for $CG_2$ includes 12 REs, and $CG_1$ has a higher priority than $CG_2$. Then, a UCI resource for each CG may be transmitted as indicated in FIG. 14 according to the above scheme.

Starting index/ending index based allocation and starting index/puncturing operation based allocation, described above, may be applied through a combination thereof. That is, UCI resource for CGs have a stating index and may be allocated while puncturing already allocated resources or may be allocated up to the ending index according to whether the eNB configures resources.

As described above, a UCI resource may be expressed by REs of physical locations in a time/frequency resource region by a mapping relationship between a logical resource region and the time/frequency resource region. As an example, UCI resources for two CGs are distinguished on logical resources as illustrated in FIG. 13, the UCI resources may be represented as actual physical resources as indicated in FIG. 15 by a mapping relationship between FIGS. 7 and 8.

Similarly, the UCI resources in FIG. 14 may be represented by actual physical resources as illustrated in FIG. 16.

2. Time/Frequency Resource Region 2.1. Method for Allocating a UCI Resource for Each CG to a Different SC-FDMA Symbol According to a specific embodiment of the present invention, a method is proposed in which, when the UE transmits UCI for a plurality of CGs on PUSCH resources, the eNB configures, for the UE, a resource region in which a UCI resource for each CG can be allocated by a plurality of SC-FDMA symbols and configures SC-FDMA symbol sets to which UCI resources for different CGs are allocated not to be equal. Alternatively, more generally, the eNB may allocate UCI resources for CGs to distinguishable time resources.

For example, in the case of HARQ-ACK, a maximum region in which coded symbols of HARQ-ACK can be allocated in PUSCH resources may be 4 SC-FDMA symbols (i.e., SC-OFDM symbols of indexes 2, 4, 9, and 11) adjacent to a PUSCH demodulation reference signal (DM-RS) as illustrated in FIG. 7. Assuming that the UE transmits UCI for two CGs (e.g. $CG_1$ and $CG_2$) on PUSCH resources, a maximum resource region in which a UCI resource for $CG_1$ may be configured by SC-FDMA symbols of indexes 2 and 4 and a maximum resource region in which a UCI resource for $CG_2$ may be configured by SC-FDMA symbols of indexes 9 and 11

FIG. 17 illustrates the case in which a UCI resource for $CG_1$ includes 15 REs and a UCI resource for $CG_2$ includes 12 REs.

2.2 Method for Allocating a UCI Resource for CG to a Different RB

According to a specific embodiment of the present invention, a method is proposed in which, when the UE transmits UCI for a plurality of CGs on PUSCH resources, the eNB configures, for the UE, a resource region in which a UCI resource for each CG can be allocated by a plurality of RBs and configures RB sets to which UCI resources for different CG are allocated not to be equal. Alternatively, more generally, the eNB may allocate UCI resources for CGs to distinguishable frequency resources.

For example, in the case of HARQ-ACK, assuming that the UE transmits UCI for two CGs (e.g. $CG_1$ and $CG_2$) on PUSCH resources consisting of 2 RBs, UCI resources for CGs may be allocated to be distinguished in different RBs.

Method for Selectively Transmitting UCI for Each CG

According to a specific embodiment of the present invention, a method is proposed in which, when the UE transmits UCI for a plurality of CGs on PUSCH resources and (after separate coding for each CG is applied), as in the UCI resource allocation scheme for each CG, UCI resources for CGs are distinguished in a resource region, the UE selectively transmits UCI for a specific CG and the eNB detects whether UCI for a specific CG has been transmitted by performing BD in each resource region to which a UCI resource for each CG is applied. In this case, the eNB may first detect UCI for a CG having a high priority (or an early order). In this case, the UE does not transmit UCI for a CG for which a PDSCH/PDCCH (requiring ACK/NACK feedback) is not received and fills a corresponding UCI resource with data. In other words, (with respect to each CG,) when there is no scheduling for all cells belonging to the CG, data may not be punctured on a UCI resource corresponding to the CG. Conversely, when there is scheduling for at least one cell belonging to the CG, data may be punctured on a UCI resource corresponding to the CG and UCI (e.g., ACK/NACK) corresponding to the CG may be mapped.

For example, in FIG. 8, when PDSCH scheduling is not present at a reference timing of HARQ-ACK transmission for $CG_1$ and there is no HARQ-ACK information to be transmitted for $CG_1$, UCI for $CG_1$ may not be transmitted and data transmission may be performed on a corresponding UCI resource.

[Exemplary CG Configuration]

When a cell defined in a licensed band is referred to as L-cell and a cell defined in an unlicensed hand is referred to as U-cell, one of the following CG configurations may be considered as an exemplary CG configuration capable of using the above proposed scheme.

(1) A CG ($CG_1$) consisting only of the L-cell and a CG ($CG_2$) consisting only of the U-cell (2) A CG ($CG_1$) consisting only of the L-cell and a CG ($CG_2$) including the U-cell and the L-cell (3) A CG ($CG_1$) including the L-cell and the U-cell and a CG ($CG_2$) consisting only of the U-cell (4) A CG ($CG_1$) consisting only of the L-cell, a CG ($CG_2$) including the L-cell and the U-cell, and a CG ($CG_3$) consisting only of the U-cell In the U-cell, opportunistic PDSCH transmission is performed based on a listen-before-talk (LBT) operation. Therefore, in the examples of (1), (2), and (3), $CG_2$ includes many U-cells so that a probability of performing PDSCH transmission is low relative to $CG_1$.

For example, in the above exemplary CG configuration, if PDSCH transmission only on $CG_1$ is present and PDSCH transmission on $CG_1$ is not present, HARQ-ACK for $CG_1$ may be transmitted on a UCI resource corresponding to $CG_1$ by applying separate coding and HARQ-ACK for $CG_1$ may be omitted.

As an example, in the case of HARQ-ACK, the UE in an FDD system of LTE may transmit HARQ-ACK for PDSCH transmission at a specific timing through UCI piggybacking on a PUSCH. If there is no PDSCH transmitted at the specific timing, the UE may not allocate coded symbols for HARQ-ACK on a PUSCH resource (e.g., DTX). In this case, the eNB may determine whether the UE has performed HARQ-ACK reporting by performing BD under the assumption that coded symbols for HARQ-ACK have been allocated. Accordingly, in a legacy LTE system, it can be assumed that the eNB has a BD capability to determine whether HARQ-ACK transmission has been performed.

However, the BD capabilities of the eNB are expected to determine only whether UCI has been transmitted, when a prescheduled UCI payload size (or a UCI resource) in a prescheduled resource region is assumed. For example, assuming that 5 CCs in total are configured for the UE and a PDSCH is transmitted on two of the 5 CCs so that the UE reports HARQ-ACK only for the two CCs through a PUSCH, the eNB has a probability of determining that HARQ-ACK for the two CCs has been reported by performing BD but cannot be aware of which of the 5 CCs correspond to the two CCs.

Therefore, the present invention may define a UCI resource for each CG which can be recognized between the eNB and the UE and separately allocate the UCI resource for each CG in a resource region so as to support BD of the eNB for determining whether UCI transmission for each CG has been performed. When a massive CA scheme is applied, the above operation enables the UE to efficiently use resources by causing the UE to omit HARQ-ACK transmission in the case of detection failure of the UE or with respect to a specific CG in which HARQ-ACK of PDSCHs for all CCs in the CG is NACK/DTX.

Hereinafter, a method will be described for expanding the concept of a DAI in a TDD system, when the UE transmits UCI for a plurality of CGs through a PUSCH and UCI for respective CGs is different.

Explicit Signaling Based UCI Resource Adaptation of eNB

A description given below considers the following exemplary CG configuration.

[Exemplary CG Configuration]

When a cell defined in a licensed band is referred to as L-cell and a cell defined in an unlicensed band is referred to as U-cell, the following CG configurations may be considered as an exemplary CG configuration capable of using the above proposed scheme.

(1) A CG ($CG_1$) consisting only of the L-cell and a CG ($CG_2$) consisting only of the U-cell (2) A CG ($CG_1$) consisting only of the L-cell and a CG ($CG_2$) including the U-cell and the L-cell (3) A CG ($CG_1$) including the L-cell and the U-cell and a CG ($CG_2$) consisting only of the U-cell (4) A CG ($CG_1$) consisting only of the L-cell, a CG ($CG_2$) including the L-cell and the U-cell, and a CG ($CG_3$) consisting only of the U-cell In the U-cell, opportunistic PDSCH transmission is performed based on an LBT operation. Therefore, in the examples of (1), (2), and (3), $CG_2$ includes many U-cells so that a probability of performing PDSCH transmission is low relative to $CG_1$.

If a PDSCH transmission opportunity differs according to each CG, how many times corresponding UCI transmissions are performed may also be different. Accordingly, the present invention proposes a method in which the eNB explicitly indicates a UCI resource for each (or a UCI payload size)

through explicit signaling in consideration of the case in which the number of UCI transmissions for each CG is different.

UL Signaling

1. UL DAI Transmission for Each CG

According to a specific embodiment of the present invention, a method is proposed in which, when the UE transmits UCI for a plurality of CGs on a PUSCH resource by applying the UCI piggybacking scheme including the aforementioned proposal, for example, by applying separate coding for each CG or applying coding for all UCI without distinguishing between the CGs, the eNB informs the UE of a UL DAI for each CG as the number of DL subframes that should be considered when the UE calculates a UCI resource (or UCI payload size) for each CG. The UL DAI for value CG may be included in control signaling (e.g., DCI) indicating transmission of the PUSCH resource.

Due to an asymmetric structure of DL/UL subframes in a TDD system of LTE, the case in which HARQ-ACK for a plurality of DL subframes should be transmitted in one UL subframe may occur. In the case, the LTE system has introduced a DL DAI and a UL DAI that indicate the accumulated number of DL subframes in which PDSCHs are transmitted within a predetermined DL subframe duration in order to consider the number of DL subframes in which PDSCH transmission has been actually performed in a HARQ-ACK payload size. For example, when N PDSCHs in total are transmitted, the UE may recognize an n-th (where n=0, 1, 2, . . . , N−1) transmitted PDSCH through the DL DAI. Therefore, even when the UE fails to detect some PDSCHs, since the UE is aware of dropped PDSCHs through the DL DAI and of the total number of PDSCHs through the UL DAI, the UE may report HARQ-ACK for the N PDSCHs in total by processing HARQ-ACK for the detection-failed PDSCHs as DTX.

When a CA scheme is considered in the TDD system, the UE may transmit HARQ-ACK for a plurality of CCs on a PUSCH resource and the number of DL subframes indicated by the UL DAI is identically applied to all of the CCs. For example, if the number of DL subframes in which PDSCHs have been actually transmitted is 3 for CC1 and 1 for CC2, the UL DAI may be transmitted to indicate 3 which is the maximum number of DL subframes for the two CCs. Then, the UE configures HARQ-ACK under the assumption that 3 DL subframes have been transmitted for both CC1 and CC2 and reports HARQ-ACK for CC2 as DTX except for one DL subframe. In this way, when a uniform UL DAI value is applied to a plurality of CCs as described above, inefficient UCI resource allocation may be performed because HARQ-ACK for CCs having few DL subframes in which actual PDSCH transmission is performed is mainly reported as DTX.

In a legacy LTE Rel-12 system, since only the case in which the number of CCs supported by the CA scheme is up to 5 has been considered, inefficiency when a UL DAI for all CCs is uniformly applied as described above has been overlooked. However, when a massive CA scheme is introduced in an LTE Rel-13 system, such a problem may be pointed out because a maximum of 32 CCs is considered. That is, a deviation of the number of DL subframes in which PDSCH transmission is performed on 32 CCs may become much severer than a deviation of the number of DL subframes in which PDSCH transmission is performed on 5 CCs. To solve the above problem, the present invention proposes a method for independently configuring a UL DAI in units of CGs by informing the UE of the UL DAI in units of CGs. In the above example, the eNB may direct the UE to omit HARQ-ACK transmission for $CG_2$ by setting a DAI for CC1 to a value corresponding to 3 DL subframes and a DAI for CC2 to a value corresponding to one DL subframe.

For example, in the above exemplary CG configuration, if PDSCH transmission for $CG_1$ is performed in 4 DL subframes and PDSCH transmission for $CG_2$ is performed in one DL subframe, the eNB may indicate 4 DL subframes as a UL DAI for $CG_1$ and one DL subframe as a UL DAI for $CG_2$ to the UE through DCI according to a UL DAI transmission scheme for each CG.

FIG. 20 illustrates a structure supporting a UL DAI for each CG with respect to a maximum of two CGs (e.g., $CG_1$ and $CG_2$) in DCI format 0.

In FIG. 20, a CIF is a carrier indicator field, 0/1A is a field for distinguishing between DCI format 0 and DCI format 1A, FH+Contiguous RA is a field indicating contiguous resource allocation together with frequency hopping or non-hopping, multi-clustered RA is a field indicating multi-cluster based resource allocation, MCS/RV is a field indicating a combination of a modulation and coding scheme (MCS) and a redundancy version (RV), NDI (new data indicator) is a field indicating whether new data is transmitted, DM-RS CS is a field indicating cyclic shift of a DM-RS, CQI req. is a field indicating the contents of aperiodic CSI reporting, SRS is a field indicating whether an SRS is transmitted, and RAT is a field indicating a resource allocation type (i.e. consecutive resource allocation or multi-clustered resource allocation). As indicated in the example, when the UL DAI for each CG is transmitted, multiple UL DAIs for a plurality of CGs may be transmitted as one method.

As an additional operation of the UL DAI transmission scheme for each CG, the eNB may transmit a single bit field to the UE through dynamic signaling such as DCI and indicate, through the bit field, UL DAI values (or the numbers of DL subframes) applied to UCI piggybacking for a plurality of CGs. That is, one state of the bit field may indicate a combination of UL DAI values (or the numbers of DL subframes) for a plurality of CGs. For example, in the case of a 2-bit field, each state may be defined as indicated in Table 8.

TABLE 8

| State of 2-bit field | Combination of UL DAIs for multiple CGs |
| --- | --- |
| 00 | UL DAI = 1 for CG1, UL DAI = 1 for CG2 |
| 01 | UL DAI = 2 for CG1, UL DAI = 2 for CG2 |
| 10 | UL DAI = 3 for CG1, UL DAI = 2 for CG2 |
| 11 | UL DAI = 4 for all CGs |

2. UCI Piggyback on/Off Indicator Transmission for Each CG

According to a specific embodiment of the present invention, a method is proposed in which, when the UE transmits UCI for a plurality of CGs on a PUSCH resource by applying the UCI piggybacking scheme including the aforementioned proposal, for example, by applying separate coding for each CG or applying coding for all UCI without distinguishing between the CGs, the eNB transmits an on/off indicator indicating whether UCI piggybacking for each CG for specific UCI is performed, as information about a CG that should be considered in a UCI resource (or UCI payload size) calculation process of the UE. The UCI piggyback on/off indicator for each CG may be included in control signaling (e.g., DCI) indicating PUSCH resource transmission.

For example, in the exemplary CG configuration of the explicit signaling based UCI resource adaptation scheme of the eNB, if PDSCH transmission on $CG_1$ is present and PDSCH transmission on $CG_2$ is not present, the eNB may instruct the UE to piggyback UCI for $CG_1$ on a PUSCH resource (i.e., "on") and instruct the UE not to piggyback UCI for $CG_2$ on a PUSCH resource (i.e., "off"), through a UCI piggyback on/off indicator according to the UCI piggyback on/off indicator transmission scheme for each CG.

When UCI piggyback is performed on a PUSCH resource in the case in which a massive CA scheme is applied in the FDD system, if UCI for all CCs configured by the eNB for the UE as in a legacy LTE system (e.g., Rel-10/11/12), UCI signaling overhead may significantly increase. Accordingly, in the FDD system, an operation may be useful in which the eNB instructs the UE to omit UCI transmission for a specific CC (e.g., $CG_2$ in the exemplary configuration in the explicit signaling based UCI resource adaptation scheme of the eNB) through the UCI piggyback on/off indicator for each CG as in the above proposed scheme in order to reduce UCI signaling overhead.

When a massive CA scheme is applied in a TDD system, if the eNB informs the UE of a UL DAI for each CG as in the UL DAI transmission scheme for each CG, the UE may more efficiently configure a UCI payload size (or a UCI resource) corresponding to the maximum number of DL subframes in which PDSCH transmission for each CG is performed. However, the above method requires UL DAIs for a plurality of CGs in DCI indicating PUSCH resource transmission and thus DL control signaling overhead may increase. Therefore, the present invention proposes a method for transmitting an on/off indicator indicating whether UCI piggyback for specific UCI for each CG is performed as a simpler method. For example, in the case of HARQ-ACK, if a UCI piggyback on/off indicator for $CG_1$ in DCI representing a PUSCH resource indicates an "off" state, the UE may omit UCI transmission for corresponding $CG_1$ and fill the corresponding UCI resource with data.

In this case, an existing UL DAI field for the TDD system may be transmitted together with the UCI piggyback on/off indicator for each CG and the UL DAI may be effectively applied only to CCs for which the UCI piggyback on/off indicator indicates an "on" state. FIG. 21 illustrates a structure supporting the UCI piggyback on/off indicator for each CG with respect to a maximum of two CGs (e.g., $CG_1$ and $CG_2$) in DCI format 0. As another method, in the TDD system, only the UCI piggyback on/off indicator may be configured to be transmitted in a state in which UL DAI field configuration and signaling are omitted. Alternatively, for a specific CG, a UL DAI may be transmitted and, for another CC, a UCI piggyback on/off indicator may be transmitted.

3. Method for Independently Configuring, for Each CC, the Number of DL Subframes Corresponding to a UL DAI According to a specific embodiment of the present invention, a method is proposed in which, when the UE transmits UCI for a plurality of CGs on a PUSCH resource by applying the UCI piggybacking scheme including the separate coding/resource mapping scheme, for example, by applying separate coding for each CG or applying coding for all of the UCI without distinguishing between CGs, the eNB informs, through a higher layer signal, the UE of information about a CG to which a specific UL DAI is applied and the number of DL subframes corresponding to the UL DAI through independent configuration for each CC and, after receiving the UL DAI from the eNB, the UE independently interprets the number of DL subframes which should be considered for UCI transmission indicated by a UL DAI for each CG with respect to a CG to which the UL DAI is applied. That is, the eNB may configure the UE to differently interpret a UL DAI according to each CG so that the UE maintains interpretation of a UL DAI with respect to a specific CG and differently interprets all or some of UL DAIs for other specific CGs.

The method for transmitting a UL DAI value for each CG to the UE according to the UL DAI transmission scheme for each CG has an advantage of efficiently allocating a UCI resource within PUSCH resources by informing the UE of the number of DL subframes which should be considered during UCI transmission for each CG. However, the UL DAI transmission method for each CG requires a multi-DAI structure as illustrated in FIG. 20 and control signaling overhead increases according to such a structure.

Meanwhile, in the massive CA scheme to which the present invention is applied, some CCs are configured in a licensed band in which PDSCH transmission is stable and the other CCs may be configured in an unlicensed band in which PDSCH transmission is opportunistically generated. In this case, when the TDD system is considered, the number of DL subframes in which PDSCH transmission is present on CCs configured in the unlicensed band may be relatively fewer than that on CCs configured in the licensed band.

In this aspect, according to the exemplary CG configuration in the explicit signaling based UCI resource adaptation scheme of the eNB, the range of the number of DL subframes in which a PDSCH can be transmitted on $CG_2$ may be less than that on $CG_1$ when $CG_1$ mainly consists of CCs of the licensed band and $CG_2$ mainly consists of CCs of the unlicensed band. Accordingly, it may be desirable that a DL subframe indicated by a UL DAI be differently interpreted for each CG. As an example, in a situation in which a CA scheme of an Rel-12 LTE system is applied, if TDD UL/DL configuration is {1, 2, 3, 4, 6} and HARQ-ACK is piggybacked on a PUSCH, the UE may map a UL DAI (e.g., $W_{DAI}^{UL}$) to the number of DL subframes (e.g., $B_c^{DL}$) as described in Reference 1.

[Reference 1]

For TDD UL/DL configurations {1, 2, 3, 4, 6} and a PUSCH transmission adjusted based on a detected PDCCH/EPDCCH with DCI format 0/4, the UE shall assume $B_c^{DL}=W_{DAI}^{UL}$. The UE shall not transmit HARQ-ACK on PUSCH if the UE does not receive PDSCH or PDCCH/EPDCCH indicating downlink SPS release in subframe(s) n-k where k∈K and $W_{DAI}^{UL}=4$.

As one example of applying the operation of the present invention, (if the number of DL subframes in which ACK/NACK feedback timings correspond commonly to one UL subframe is defined as M,) the eNB configures, for the UE, the maximum number of DL subframes in which a PDSCH is scheduled for each CG through a higher layer signal such as radio resource control (RRC) as $N_{DL,max,c}$ (<M) and the UE may calculate the number of DL subframes in which a PDSCH is scheduled as indicated in [Math.5] by applying the maximum number of DL subframes indicated by $N_{DL,max,c}$.

$$B_c^{DL}=\min\{W_{DAI}^{UL}, N_{DL,max,c}\} \qquad [\text{Math.5}]$$

For a licensed band CC $CG_1$, a mapping relationship between a UL DAI and a DL subframe, proposed in Reference 1 may be applied and, for an unlicensed band CC $CG_2$, a mapping relationship between a UL DAI and a DL subframe may be applied, in which the number of DL subframes in which a PDSCH is scheduled on $CG_2$ is limited to a maximum of $N_{DL,max,c}$ as indicated in [Math.5].

In addition, for TDD UL/DL configuration 5 and the case in which HARQ-ACK is piggybacked on a PUSCH, the UE may map a UL DAI (e.g., $W_{DAI}^{UL}$) to the number of DL subframes (e.g., $B_c^{DL}$) as described in Reference 2.

[Reference 2]

For TDD UL/DL configurations 5 and a PUSCH transmission adjusted based on a detected PDCCH/EPDCCH with DCI format 0/4, the UE shall assume $$B_c^{DL} = W_{DAI}^{UL} + 4\lfloor(U - W_{DAI}^{UL})/4\rfloor$$

where U denotes the maximum value of $U_c$ among all the configured serving cells, $U_c$ is the total number of received PDSCHs and PDCCH/EPDCCH indicating downlink SPS release in subframe(s) n-k on the c-th serving cell, k∈K. The UE shall not transmit HARQ-ACK on PUSCH if the UE does not receive PDSCH or PDCCH/EPDCCH indicating downlink SPS release in subframe(s) n-k where k∈K and $$W_{DAI}^{UL} = 4.$$

In Reference 2, one UL DAI value may mean a plurality of DL subframes in association with the detected number of PDSCHs (e.g., U) because it is assumed that a possibility of failing to detect 4 or more consecutive PDSCHs is very low. However, in an unlicensed band CC, a PDSCH detection failure possibility may increase and thus a DL subframe group that can be reliably distinguished by the UE may be different from a value proposed in Reference 1. As an example, assuming that a possibility of consecutively failing to detect 5 PDSCHs even in the unlicensed band CC is low, a mapping relationship between a UL DAI and a DL subframe may be configured as indicated in [Math.6].

$$B_c^{DL} = W_{DAI}^{UL} + 5\lfloor(U - W_{DAI}^{UL})/5\rfloor \qquad [\text{Math.6}]$$

Additionally, the eNB may predetermine reference configuration regarding the number of DL subframes corresponding to a UL DAI value and indicate whether a specific UL DAI conforms to the reference configuration or independent configuration for each CG according to the operation of the present invention by adding a bit field to DCI indicating a PUSCH resource. For example, one bit may be added to DCI to indicate whether a UL DAI applies the number of DL subframes according to the mapping relationship of Reference 1 to all CGs or independently applies the number of DL subframes according to the mapping relationship of Table 8 to each CG.

The operation of the present invention may also be extended to a DL DAI. That is, the eNB may independently configure, for the UE, the number of DL subframes indicated by the DL DAI with respect to each CG or interpretation of the DL DAI.

According to a specific embodiment of the present invention, a method is proposed in which, when the UE transmits UCI for a plurality of CGs on a PUSCH resource by applying the UCI piggybacking scheme including the separate UCI coding/resource mapping scheme for each CG, for example, by applying separate coding for each CG or applying coding for all of the UCI without distinguishing between CGs, the eNB configures, for the UE, an offset value for a UL DAI value (or the number of DL subframes indicated by a UL DAI value) for each CG through a higher layer signal and informs the UE of an indicator indicating whether to apply the UL DAI offset value for each CG to the UCI piggybacking process of a PUSCH resource.

As a modified operation of the method for independently configuring the number of DL subframes corresponding to the UL DAI with respect to each CG, the UL DAI offset value for each CG may be preconfigured to distinguish between interpretations of UL DAI offset values of CGs and the eNB may transmit dynamic signaling indicating whether to apply the UL DAI offset value to the UE, thereby flexibly adjusting a UCI payload size.

DL Signaling

1. DL/UL DAI Across all CGs for Each CG (Hereinafter, "DL/UL DAI Across CCs for Each CC") Transmission According to a specific embodiment of the present invention, a method is proposed in which, when the UE transmits UCI for a plurality of CGs on a PUSCH resource by applying the UCI piggybacking scheme including the separate UCI coding/resource mapping scheme for each CG, for example, by applying separate coding for each CG or applying coding for all of the UCI without distinguishing between CGs, the eNB informs the UE of a DL DAI indicating the accumulated number of PDSCH transmissions within the CG up to a corresponding PDSCH transmission timing through DL control signaling (e.g., DCI) indicating specific PDSCH transmission within the CG. The DL DAI represents the accumulated number of all PDSCHs transmitted for all CCs in the CG and in all DL subframe durations configured in the TDD system. Similarly, the eNB may inform the UE of a UL DAI indicating the accumulated number of PDSCHs commonly assumed by the UE for all CGs (all CCs and all configured DL subframe durations are assumed) through DCI indicating PUSCH transmission. In this case, an order of PDSCH transmissions indicated by the DL DAI in the CG may be assigned in a time-first manner. The number of PDSCHs transmitted in all CCs in the CG and in all DL subframe durations configured in the TDD may be calculated by adding the number of DL subframes in which a PDSCH for each CC is transmitted. An operation according to this scheme has an advantage of reusing existing signaling by extending the concept of an existing DAI.

However, in the LTE system according to an embodiment of the present invention, an additional UL/DL DAI field is not present in DCI in the FDD system and a DAI field of DCI format 0 in the TDD system is used to indicate a UL index for multiple UL subframe scheduling rather than for a UL DAI, in the case of UL-DL configuration #0. Accordingly, a DL/UL DAI for counting PDSCH transmission in a DL subframe duration and for CCs in the CG may be provided as one of the following two methods.

(i) Introduction of an additional bit field in DCI (ii) (In the case of TDD UL-DL configuration #0) pre-configuration of a UL DAI value according to each state of a UL index In this case, if the hit field is added in the DCI according to (i), the DCI including the added bit field should be defined only when the DCI is transmitted in a UE-specific search space (USS) because introduction of the additional bit field in DCI format 0 in a common search space (CSS) is not desirable when coexistence with the UE performing a legacy operation in the CSS and a fallback operation in the CSS are considered.

The DL/UL DAI across CCs for each CG may be signaled only for specific CGs and may not be signaled for the other CGs. For example, the DL/UL DAI across CCs may not be signaled for a CG consisting only of an L-cell and may be signaled for a CG including a U-cell.

2. DL DAI Signaling and Interpretation Method of UE During Multi-CC/Multi-Subframe Scheduling 2.1. Separate DL/DAI Configuration and Interpretation According to Single/Multiple PDSCH Scheduling According to a specific embodiment of the present invention, a method is proposed in which the UE independently interprets a value indicated by a DL DAI within each DCI type, when the eNB informs the UE of a DL DAI indicating the accumulated number of PDSCH transmissions up to a corresponding PDSCH transmission timing in DCI indicating specific PDSCH transmission, DCI indicating single PDSCH scheduling is referred to as DCI type 1, and DCI indicating multiple PDSCH scheduling is referred to as DCI type 2. That is, a DL DAI in DCI type 1 means the accumulated number of PDSCH transmissions indicated by DCI type 1 and a DL DAI in DCI type 2 means the accumulated number of PDSCH transmissions (or the number of DL scheduling) indicated by DCI type 2. In this case, the UE may distinguish between DCI types by the length of DCI or a radio network temporary identifier (RNTI) scrambled into a CRC hit of the DCI.

In an LTE Rel-8 system according to an embodiment of the present invention, multiple states for the number of subframes in which PDSCHs are transmitted are expressed in Reference 3 below by a DL DAI having a bit field having 2 bits. For example, state '00' of a DL DAI may indicate that 1, 5, or 9 PDSCHs are accumulatively transmitted. The reason why the accumulated number of PDSCH transmissions is represented by one state as described above is that a possibility that the UE consecutively fails to detect plural (e.g., 4) PDCCH (or DCI) transmissions is expected to be very low.

[Reference 3]

Table 9

| DAT MSB, LSB | VUL, DAI or VDL, DAI | Number of subframes including PDCCH/EPDCCH indicating PDSCH transmission and DL SPS release |
|---|---|---|
| 0, 0 | 1 | 1, 5 or 9 |
| 0, 1 | 2 | 2, 6 or 10 |
| 1, 0 | 3 | 3 or 7 |
| 1, 1 | 4 | 0, 4 or 8 |

It is assumed that a DL/UL DAI represents the accumulated number of PDSCH transmissions in the CC domain, DCI A in a specific DL subframe indicates multi-CC scheduling for 4 CCs (e.g., CC1, CC2, CC3, and CC4), and DCI B represents single CC scheduling for one CC (e.g., CC5), according to the DL/UL DAI across CCs for each CG In this case, the eNB may allocate a PUSCH resource by DCI indicating a UL grant with respect to a UL subframe in which an ACK/NACK resource for a DL subframe is transmitted and the eNB may indicate ACK/NACK transmission for 5 PUSCHs by a UL DAI value in the DCI. It is assumed that the eNB informs the UE that 4 accumulative PDSCHs are transmitted by setting a DL DAI value in DCI A to '11' and that 5 accumulative PDSCHs are transmitted by setting a DL DAI value in DCI B to '00'.

In this case, when the UE fails to detect DCI A and succeeds in detecting DCI B, if the DL DAI value '00' in DCI B means transmission of 1, 5, or 9 accumulative PDSCHs similar to existing design, the UE has a difficulty in determining whether the first PDSCH among 5 PDSCHs has been successfully detected or the fifth PDSCH has been successfully detected. The reason why it is difficult to determine detection is that the UE should consecutively fail to detect DCI four times in order to judge '00' as 5 accumulative PDSCHs in the case of single PDSCH scheduling and a possibility that such a case occurs is very low. However, when multiple PDSCH scheduling such as multi-CC scheduling is considered, a situation in which it is difficult for the UE to make a decision may occur even when the UE fails to detect DCI once as described in the above example.

Accordingly, the present invention proposes a method in which the UE separately interprets a DL DAI with respect to the case in which a DL DAI indicates single PDSCH scheduling (or DCI indicates single PDSCH scheduling) and the case in which the DL DAI indicates multiple PDSCH scheduling (or DCI indicates multiple PDSCH scheduling). As an example, the accumulated number of PDSCH transmissions indicated by the DL DAI in DCI indicating single PDSCH scheduling does not include PDSCHs corresponding to DCI indicating multiple PDSCH scheduling. Similarly, the accumulated number of PDSCH transmissions (or the number of DL scheduling) indicated by the DL DAI in DCI indicating multiple PDSCH scheduling does not include PDSCHs corresponding to DCI indicating single PDSCH scheduling.

2.2. DL/UL DAI Application Method for Multiple PDSCH Scheduling

According to a specific embodiment of the present invention, a method is proposed in which the eNB semi-statically informs the UE of the number of PDSCHs or the maximum number of PDSCHs which can be DL scheduled by one DCI and informs the UE of a DL DAI indicating the accumulated number of DL scheduling (or the accumulated number of DCI) up to a corresponding DCI transmission timing in DCI indicating specific PDSCH transmission. In this case, the accumulated number may be counted in a specific CC group and during a specific DL subframe duration, scheduled between the eNB and the UE. Similarly, the eNB may inform the UE of a UL DAI indicating the accumulated number of DL scheduling (or the accumulated number of DCI or the accumulated number of PDSCHs) to be assumed by the UE for HARQ-ACK response feedback in DCI indicating PUSCH transmission. In this case, the accumulated number may be counted in a specific CC group and during a specific DL subframe duration, prescheduled between the eNB and the UE. Meanwhile, the UE may calculate an entire HARQ-ACK payload by the number of DL scheduling indicated by a UL DAI and the maximum number of PDSCHs which can be transmitted in each DL scheduling. For example, the entire HARQ-ACK payload size may be proportional to the product of the accumulated number of DL scheduling indicated by the UL DAI and the maximum number of PDSCHs which can be indicated by DL scheduling. In this case, DL scheduling represents an operation in which the eNB indicates PDSCH transmission through DL control signaling (e.g., DCI).

Even in the case of multiple PDSCH scheduling, if a DL subframe in which corresponding DCI is transmitted is preconfigured and the number of PDSCHs supported by multiple PDSCH scheduling is semi-statically configured, a DL DAI and a UL DAI may be effectively applied. As an example, it is assumed that the UE feeds back HARQ-ACK for PDSCHs that corresponding DCI schedules with respect to a DL subframe in which DCI for multiple PDSCH scheduling is transmitted to the eNB in a specific single UL subframe. It is also assumed that the eNB sets the number of PDSCHs supported by multiple PDSCH scheduling to M.

Then, the eNB may inform the UE of a DL DAI indicating the number of DL scheduling (or the number of DCI indicating plural PDSCH transmissions) (for multiple PDSCHs) accumulated up to corresponding DCI transmission in DCI indicating plural PDSCH transmissions or inform the UE of a UL DAI indicating the accumulated number of DL scheduling assumed by the UE (for multiple PDSCHs), the accumulated number of PDSCHs, or the accumulated number of DCI indicating a plurality of PDSCHs, in DCI indicating PUSCH transmission. The UE may then calculate an entire HARQ-ACK payload by the accumulated number of DCI indicated by the UL DAI and the number of PDSCHs (e.g., M) of multiple PDSCH scheduling, confirms which DL scheduling is omitted through the DL DAI, and when omitted DL scheduling is detected, report NACK for the M PDSCHs.

That is, an operation may be performed in the form of increasing only an ACK/NACK payload size for each DL scheduling from a legacy operation of a DL DAI and a UL DAI.

2.3. Separate Coding and Separate UCI Resource Allocation Method According to Single/Multiple PDSCH Scheduling According to a specific embodiment of the present invention, a method is proposed in which, when the UE piggybacks UCI on a PUSCH resource being transmitted, channel coding is applied by distinguishing between HARQ-ACK information for single PDSCH scheduling and HARQ-ACK information for multiple PDSCH scheduling and coded symbols of the two distinguished groups (i.e., a coded symbol for single PDSCH scheduling and a coded symbol for multiple PDSCH scheduling) are allocated to distinguishable UCI resources.

If HARQ-ACK for multiple PDSCH scheduling is excluded from a HARQ-ACK transmission process for single PDSCH scheduling, the HARQ-ACK transmission process for single PDSCH scheduling has an advantage of applying a method of a legacy LTE system except for additionally determining single or multiple PDSCH scheduling.

In this case, if the form of multiple PDSCH scheduling is multi-CC scheduling, DCI for single CC scheduling and DCI for multi-CC scheduling may coexist in a specific DL subframe. In addition, if HARQ-ACK for a PDSCH transmitted in the DL subframe is transmitted through a UCI piggybacking process in a PUSCH resource in a specific single UL subframe, a UL DAI may be interpreted as the number of DL scheduling in the case of multi-CC scheduling unlike a conventional scheme and thus HARQ-ACK for multi-CC scheduling is desirably transmitted separately from HARQ-ACK for single-CC scheduling.

In this case, a UL DAI for single PDSCH scheduling and a UL DAI for multiple PDSCH scheduling may have distinguishable bit fields.

UCI Adaptation Method in Case of UCI on PUSCH Over CG

"UCI on PUSCH over CG" refers to an operation in which the UE piggybacks UCI for CCs belonging to different CGs on a single PUSCH resource.

PUCCH Reference CG Based Separate/Joint UCI Coding

According to a specific embodiment of the present invention, a method is proposed for applying separate UCI coding and separate RE mapping (for a coded UCI symbol) or applying joint coding and corresponding RE mapping for a plurality of PUCCH CGs, in units of a group of CCs in which cells for PUCCH transmission are identically configured (hereinafter, a PUCCH CG) as described below, when the UE can piggyback UCI for CCs belonging to different CGs on a single PUSCH resource (i.e. an operation of UCI on PUSCH over CG can be performed).

(1) Application of separate UCI coding and separate RE mapping (for a coded UCI symbol) to each of plural CGs: In this case, the plural CGs may be CGs randomly configured in a single PUCCH situation or CGs associated or configured with PUCCHs in a dual PUCCH situation.

(2) Application of joint UCI coding and corresponding RE mapping to all of plural CGs: In this case, the plural CGs may be CGs associated/configured with respect to each PUCCH in a dual PUCCH situation.

While the separate UCI coding and separate RE mapping method for each CG which can be randomly configured has been proposed hereinabove, the "PUCCH reference CG based separate/joint UCI coding" operation provides separate UCI coding and separate RE mapping in units of PUCCH CGs. In this case, when the UE performs UCI piggybacking in a PUSCH resource, the UE may piggyback UCI for a CG in which scheduling is present on a corresponding CG with respect to each PUCCH CG and may not piggyback UCI for a CG on which scheduling is not present. "PUCCH reference CG based separate/joint UCI coding" includes a method for maximizing coding gain by applying joint UCI coding to a plurality of PUCCH CGs when joint UCI coding is applied.

When separate coding per PUCCH CG in (1) is applied, an RE mapping order for a coded UCI symbol may conform to an index order of the PUCCH CG. Alternatively, in the case of dual PUCCHs, RE mapping for a PUCCH CG including a primary cell (hereinafter, PCG) may first be performed and RE mapping for a PUCCH CG which does not include a primary cell (hereinafter, an SCG) may subsequently be performed. The primary cell refers to a cell in charge of RRC connection in a CA environment.

When joint coding is applied to all PUCCH CGs in (2), an input order of a channel coder (e.g., RM coder) may be determined according to a cell index (or a CC index) as in the CA environment or UCI for a PCG may be first input and UCI for an SCG may subsequently be input. In this case, an order of UCI input to each PUCCH CG may conform to a cell index (or a CC index).

A/N Spatial Bundling

According to a specific embodiment of the present invention, a method is proposed for determining whether to apply spatial bundling for HARQ-ACK (hereinafter, A/N spatial bundling) corresponding to CG according to a combination of a duplexing scheme of a PUCCH cell for each PUCCH CG and a PUCCH transmission type (e.g., PUCCH format 3 (hereinafter, PF3) or channel selection (hereinafter, CHsel), when a HARQ-ACK payload size of CCs in all PUCCH CGs is greater than specific B bits (e.g., 20 bits) in the case in which the UE piggybacks UCI for a plurality of PUCCH CGs (i.e., a group of CCs in which cells for PUCCH transmission are identically configured) on a single PUSCH resource. Herein. A/N spatial bundling means applying AND operation after calculating a HARQ-ACK bit (e.g., a bit indicating ACK or NACK) for each TB when two or more TBs are transmitted. For example, in the case of {ACK (='1'), NACK (='0')}, NACK (='1' & '0'='0') is derived as a result of spatial bundling.

(1) Option 1: Uniformly apply spatial bundling to A/N of all CGs (2) Option 2: Determine whether to apply A/N spatial bundling for each CG according to a combination of a duplexing scheme of a PUCCH cell and a PUCCH format

[Example] the Case in which a Maximum of 5 Cells (or CCs) is Included in Each PUCCH CG, Two PUCCH Cells are Present, and B=20 Bits

TABLE 10

| PUCCH Cell 1 | PUCCH Cell 2 | PUCCH CG including PUCCH cell 1 | PUCCH CC including PUCCH cell 2 |
|---|---|---|---|
| TDD PF3 | FDD PF3 | A/N spatial bundling | — |
| TDD PF3 | FDD PF3 | A/N spatial bundling | A/N spatial bundling |
| TDD PF3 | FDD CHsel | A/N spatial bundling | — |
| TDD CHsel | FDD PF3 | — | — |
| TDD CHsel | FDD CHsel | — | — |

In this case, whether a HARQ-ACK payload size exceeds B bits is determined based on a HARQ-ACK payload size for all PUCCH CGs when joint coding is applied to all PUCCH CGs and on a HARQ-ACK payload size for each CG when separate coding is applied to each PUCCH CG.

Alternatively, a method for determining whether to apply A/N spatial bundling to each CG may be defined as follows.

(1) If a HARQ-ACK payload size for all PUCCH CGs exceeds B bits, A/N spatial bundling for each PUCCH CG is performed according to the following priority until the HARQ-ACK payload size is less than the B bits.

A. PUCCH CG (including a TDD PF3 PUCCH cell)>PUCCH CG (including TDD CHsel)>PUCCH CG (including an FDD PF3 PUCCH cell)>PUCCH CG (including FDD CHsel)

B. If two PUCCH CGs have the same duplexing scheme of PUCCH cells and the same PUCCH transmission type, A/N spatial bundling may first be performed with respect to an SCG or A/N spatial bundling may be performed according to a CG index.

Similarly, even in the above case, whether a HARQ-ACK payload size exceeds the B bits is determined based on a HARQ-ACK payload size for all PUCCH CGs when joint coding is applied to all PUCCH CGs and on a HARQ-ACK payload size for each CG when separate coding is applied to each PUCCH CG.

As an additional operation of the present invention, if there is a plurality of available PUSCH resources, the UE may transmit only UCI corresponding to one CG to each PUSCH for piggybacking and, if only one available PUSCH resource is present, the UE may transmit UCI corresponding to all CGs to a corresponding PUSCH for piggybacking. In the latter case, separate coding and separate RE mapping may be applied to each of the CGs and, in the former case, separate coding and separate RE mapping may be applied only to HARQ-ACK feedback (CSI feedback is piggybacked on one specific PUSCH resource) or only to HARQ-ACK feedback and RI/PTI feedback (the other CSI feedback (e.g., CQI/PMI) is piggybacked on one specific PUSCH resource). FIG. 22 illustrates an example of the above operation of transmitting UCI on a subset basis when a plurality of available PUSCH resources is present.

As an additional operation of the present invention, the following proposals may be applied, when a CC domain DAI indicating order information of scheduled CCs is present, the CC domain DAI is defined for each CG (i.e., $C\text{-}DAI_1$ and $C\text{-}DAI_2$) with respect to $CG_1$ consisting only of CCs configured to transmit one TB and $CG_2$ consisting only of CCs configured to transmit up to 2 TBs, and the CC domain DAI is transmitted in DCI for a PDSCH transmitted in a corresponding CG (i.e., the CC domain DAI is independently applied/signaled with respect to each CG).

[Proposed Method A-1] A total DAI (hereinafter, T-DAI) indicating the total number of CCs scheduled for all CCs included in $CG_1$ and $CG_2$ is defined separately from the CC domain DAI and both the T-DAI and the CC domain DAI are transmitted through DL scheduling grant DCI.

For example, it is assumed that $CG_1$ consists of $CC_1$, $CC_2$, $CC_3$, $CC_4$, and $CC_5$ and $CG_2$ consists of $CC_6$, $CC_7$, $CC_8$, $CC_9$, and $CC_{10}$. If an eNB schedules $CC_1$, $CC_3$, $CC_4$, $CC_7$, $CC_8$ and $CC_9$, then $C\text{-}DAI_1$ values for $CC_1$, $CC_3$ and $CC_4$ may indicate 1, 2, and 3, respectively, and $C\text{-}DAI_2$ values for $CC_7$, $CC_8$, and $CC_9$ may indicate 1, 2, and 3, respectively. In this case, if the UE fails to detect DCI for all PDSCHs transmitted in $CG_1$, the eNB expects a UCI (e.g., A/N) payload of 9 (=3×1+2×3) bits but the UE configures a UCI (e.g., A/N) payload of 6 (=2×3) bits, thereby resulting in inconsistency between the eNB and the UE. To eliminate such inconsistency, the present invention proposes a method for including a T-DAI indicating the total number of scheduled CCs, as an indicator for an entire UCI (e.g., A/N) payload, in DCI corresponding to all PDSCHs transmitted in $CG_1$ or $CG_2$. For example, in the above example, the T-DAI value may be indicated as 6 and the eNB and UE may schedule a value (e.g., 6×2=12) corresponding to a product of a value (e.g., 6) indicated by the T-DAI and the total number (e.g., 2) of TBs configured to be transmitted in an arbitrary CC as a UCI (e.g., A/N) payload.

[Proposed Method A-2] The eNB configures a specific PUCCH format (or a maximum UCI payload preconfigured by the eNB) having a maximum payload size of $N_1$ bits and the UE calculates a product $N_2$ of the total number of CCs indicated by the T-DAI received in Proposed Method A-1 and the maximum number (e.g., 2) of TBs configured to be transmitted in an arbitrary CC and sets a UCI payload size (e.g., an A/N payload size), N, to $N=\min(N_1, N_2)$ bits.

Using the T-DAI defined in Proposed Method A-1 of the present invention, the eNB and the UE may schedule a UCI (e.g., A/N) payload therebetween. For example, the eNB and the UE may schedule a value (e.g., N2) corresponding to a product of a value indicated by the T-DAI and the maximum number of TBs as a UCI (e.g., A/N) payload. However, if the eNB preallocates a PUCCH format having a maximum UCI (A/N) payload of $N_1$ hits, the UE desirably configures a UCI (e.g., A/N) payload as $N_2$ bits when $N_2$ is less than $N_1$ and as $N_1$ bits when $N_2$ is greater than $N_1$. That is, the UCI payload may be set to $\min(N_1, N_2)$ bits.

[Proposed Method A-3] With respect to N bits (or $N_1=N$ bits are considered without additional T-DAI signaling) configured in Proposed Method A-2, the UE fills UCI (e.g., A/N) for $CG_1$ (a CG consisting of CCs having one TB) according to an index order of $C\text{-}DAI_1$ starting from a least significant bit (LSB) (or a most significant bit (MSB)) of a UCI payload (i.e., so as to map a high (or low) UCI hit index to $C\text{-}DAI_1$ of a low index) and fills UCI (e.g., A/N) for $CG_2$ (a CG consisting of CCs having two TBs) according to an index order of $C\text{-}DAI_2$ starting from an MSB (or an LSB) (i.e., so as to map a low (or high) UCI bit index to $C\text{-}DAI_2$ of a low index).

According to Proposed Methods A-2 and A-3, if DCI for the last-ordered scheduled CC of each CG is omitted even when a UCI payload is configured, the UE is unable to know in which order UCI (e.g., A/N) for CCs is filled. For example, in Proposed Method A-1, it may be assumed that UCI (e.g., A/N) for CCs scheduled in $CG_1$ is filled in order of a low index of C-DAI$_1$ and UCI (e.g., A/N) for CCs scheduled in CG$_2$ is filled in order of a low index of C-DAI$_2$ in a state in which the UE fails to detect DCI for CC$_4$ and CC$_9$. In this case, while the eNB expects 3 UCI (e.g., A/N) for 1 TB and 3 UCI (e.g., A/N) for 2 TBs, the UE transmits 2 UCI (e.g., A/N) for 1 TB and 2 UCI (e.g., A/N) for 2 TBs, thereby resulting in inconsistency between the eNB and the UE. Accordingly, the present invention proposes a method for reducing inconsistency between the eNB and the UE by filling UCI (e.g., A/N) for CG$_1$ (a CG consisting of CCs having one TB) according to an index order of C-DAI$_1$ starting from an LSB (or an MSB) and filling UCI (e.g., A/N) for CG$_2$ (a CG consisting of CCs having two TBs) according to an index order of C-DAI$_2$ starting from an MSB (or an LSB), when a UCI (e.g., A/N) of N bits is configured in Proposed Method A-2.

As a specific example, assuming that a bit stream obtained by numerating bits in a UCI payload starting from an MSB is $b_0, b_1, \ldots, b_{N-1}$, 1-bit UCI corresponding to C-DAI$_1$=1, 2, 3 may be sequentially arranged/mapped to bits $b_{N-1}, b_{N-2}$, and $b_{N-3}$, respectively and 2-bit UCI corresponding to C-DAI$_2$=1, 2, 3 may be sequentially arranged/mapped to bits $(b_0, b_1)$, $(b_2, b_3)$, $(b_4, b_5)$, respectively.

As an additional operation of the present invention, the following methods are proposed when order information (or counting information) of scheduled CCs is present, a CC domain DAI for each CG is defined with respect to CG$_1$ and CG$_2$ (i.e., C-DAI$_1$ and C-DAI$_2$), and the CC domain DAI is transmitted in DCI for a PDSCH transmitted in a corresponding CG (i.e., the CC domain DAI is independently applied/signaled to each CG).

[Proposed Method B-1] A method is proposed for applying and signaling all DAIs indicating the total number of TBs scheduled in a plurality of CGs when a counter DAI for each CG, indicating the number of CCs scheduled for CG with respect to each of the CGs is applied and signaled.

For example, when CC domain DAIs are defined (i.e., C-DAI$_1$ and C-DAI$_2$) for each CG with respect to CG$_1$ consisting of CCs configured to transmit one TB and CG$_2$ consisting of CCs configured to transmit two TBs and transmitted in DCI for a PDSCH transmitted in a corresponding CG, it is assumed that CG$_1$ consists of CC$_1$, CC$_2$, CC$_3$, CC$_4$, and CC$_5$ and CG$_2$ consists of CC$_6$, CC$_7$, CC$_8$, CC$_9$, and CC$_{10}$. If the eNB schedules CC$_1$, CC$_3$, CC$_4$, CC$_7$, CC$_8$, and CC$_9$, values of C-DAI$_1$ for CC$_1$, CC$_3$, and CC$_4$ may indicate 1, 2, and 3, respectively and values of C-DAI$_2$ for CC$_7$, CC$_8$, and CC$_9$ may indicate 1, 2, and 3, respectively. Next, it may be assumed that the UE has not received DCI only for CC$_9$ among scheduled CCs. If a T-DAI indicating the total number of scheduled CCs is applied and signaled as indicated in A-1 of the present invention, the UE is informed that 6 cells have been scheduled, through the T-DAI and, in this case, the UE may recognize that DCI for one cell has been missed but cannot be aware of whether a fourth-scheduled CC has been present and the UE has missed a fourth-scheduled CC from CG$_1$ or whether the UE has missed a third-scheduled CC (i.e., CC$_9$) from CG$_2$, thereby generating a situation in which payload calculation is not clear. Therefore, the present invention proposes a method for applying and signaling a T-DAI indicating the total number of TBs scheduled in a plurality of CGs. In the above example, if the T-DAI indicates the total number of TBs as 9 (=1×3+2×3), the UE may judge that scheduling for two TBs has been missed. As a specific example, when it is assumed that a possibility of consecutively missing 4 consecutive cells is low, a 2-bit counter DAI of a cell level may be applied to each of a 1-TB CG and a 2-TB CG and a total 3-bit DAI of a TB level may be applied to the two CGs.

[Proposed Method B-2] A method is proposed for defining a total DAI 1 (hereinafter, T-DAI$_1$) indicating the total number of CCs (or TBs) scheduled among CCs in CG$_1$ to transmit T-DAI$_2$ in DL scheduling grant DCI for CG$_1$ and defining a total DAI 2 (hereinafter, T-DAI$_2$) indicating the total number of CCs (or TBs) scheduled among CCs in CG$_2$ to transmit T-DAI$_2$ in a DL scheduling grant DCI for CG$_2$ when a counter DAI for each CG (i.e., C-DAI$_1$ and C-DAI$_2$), indicating the number of scheduled CCs for each CG with respect to two CGs (i.e., CG$_1$ and CG$_2$) is applied and signaled and for feeding back UCI using PUCCH resource 1 when the UE determines that scheduling only for CG$_1$ or CG$_2$ is present and using PUCCH resource 2 when the UE determines that scheduling for CG$_1$ and CG$_2$ is present.

If the number of scheduled CCs in each CG is indicated by a total DAI for each CG as described above, the eNB and the UE may calculate different payloads in the case of missing all of DCI for a specific CG. Accordingly, the present invention proposes a method in which the UE performs UCI feedback by selecting a PUCCH resource according to a combination of scheduled CGs determined thereby so that the eNB may judge a DCI missing problem in a specific CG through BD. More specifically, when two CCs, CG$_1$ and CG$_2$ are present, the eNB may configure different PUCCH resources (e.g., PUCCH$_1$, PUCCH$_2$, and PUCCH$_3$) with respect to a combination of 3 scheduled CGs {CG$_1$}, {CG$_2$}, and {CG$_1$, CG$_2$} and the UE may feed back UCI to a PUCCH corresponding to the combination of scheduled CGs according to a DCI detection result.

[Proposed Method B-3] A method is proposed for defining a total DAI (hereinafter, T-DAI$_{ALL}$) indicating the total number of CCs (or TBs) scheduled among CCs in CG$_1$ and CG$_2$ (i.e., CCs in a union of CG$_1$ and CG$_2$) to transmit T-DAI$_{ALL}$ in DL scheduling grant DCI for CG$_1$ and defining a total DAI 2 (hereinafter, T-DAI$_2$) indicating the total number of CCs (or TBs) scheduled among CCs in CG$_2$ to transmit T-DAI$_2$ in DL scheduling grant DCI for CG$_2$, when a counter DAI for each CG (i.e., C-DAI$_1$ and C-DAI$_2$) indicating the number of scheduled CCs in each CG is applied and signaled with respect to two CGs (i.e., CG$_1$ and CG$_2$).

When two CGs, CG$_1$ and CG$_2$, are defined and the number of CCs scheduled in each CG is indicated as total DAIs (e.g., T-DAI$_1$ and T-DAI$_2$) for each CG, if the eNB performs scheduling for some CCs in CG$_1$ and some CCs in CG$_2$, the UE may recognize a scheduling situation as the following three cases.

(1) The UE may determine that scheduling only for CG$_1$ is present and calculate an A/N payload as T-DAI$_1$.

(2) The UE may determine that scheduling for CG$_2$ is present and calculate an A/N payload as T-DAI$_2$.

(3) The UE may determine that scheduling for both CG$_1$ and CG$_2$ is present and calculate A/N payloads as T-DAI$_1$ and T-DAI$_2$.

In this case, the eNB should be aware of which assumptions are made when the UE configures an A/N payload (or a UCI payload) by performing BD for the above three situations. However, if A/N payloads (or UCI payloads) for CG$_1$ and CG$_2$ have the same value, the eNB cannot determine for which CG the UE has transmitted A/N (or UCI). Accordingly, the present invention proposes a method for applying and signaling T-DAIALL indicating the total number of CCs (or TBs) scheduled in two CGs with respect to one (e.g., CG$_1$) of two CGs (e.g., CG$_1$ and CG$_2$) and applying and signaling T-DAI$_2$ indicating the total number of CCs (or TBs) scheduled in a corresponding CG with respect to the other CG (e.g., $CG_2$). In this case, a mapping order of an A/N payload (or UCI payload) may conform to an order of $CG_1 > CG_2$. That is, A/N (or UCI) for a CG to which T-$DAI_{ALL}$ is applied is allocated first. According to an operation of the present invention, the UE in the above example may recognize a scheduling situation again as the following two cases.

(1) The UE determines that scheduling for at least $CG_1$ is present and calculates an A/N payload as T-$DAI_{ALL}$.

(2) The UE determines that scheduling only for $CG_2$ is present and calculates an A/N payload as T-$DAI_2$.

In this case, since T-$DAI_{ALL}$ will always have a value greater than T-$DAI_2$, the eNB may distinguish between T-$DAI_{ALL}$ and T-$DAI_2$ by a UCI payload size.

[Proposed Method B-4] A method is proposed in which, when a counter DAI (i.e., C-$DAI_1$ and C-$DAI_2$) for each CG, indicating the number of CCs scheduled in each CG with respect to two CGs (i.e., $CG_1$ and $CG_2$) is applied and signaled, a total DAI 1 (hereinafter, T-$DAI_1$) indicating the total number of CCs (or TBs) scheduled among CCs in $CG_1$ is defined to transmit T-$DAI_1$ in DL scheduling grant DCI for $CG_1$, a total DAI 2 (hereinafter, T-$DAI_1$) indicating the total number of CCs (or TBs) scheduled among CCs in $CG_2$ is defined to transmit T-$DAI_2$ in DL scheduling grant DCI for $CG_2$, and the UE indicates for which CG combination feedback has been performed by adding M bits during UCI (or A/N) feedback.

For example, the UE may add 2 bits in a process of configuring an A/N payload to indicate that A/N only for CG1 is present in the case of '01', that A/N only for $CG_2$ is present in the case of '10', and that A/N for $CG_1$ and $CG_2$ is present in the case of '11'. Then, the eNB may determine which assumption the UE has made for the three scheduling situations described in Proposed Method B-3. Alternatively, the UE may use one bit to indicate only whether A/N for a specific CG (e.g., $CG_2$) is included. In this case, the UE may distinguish between the case in which A/N only for $CG_2$ is fed back and the case in which A/N for $CG_1$ and $CG_2$ is fed back by BD.

When Proposed Methods B-1, B-2, B-3, and B-4 are applied, a mapping order on an A/N payload may conform to Proposed Method A-3.

FIG. 23 is a block diagram of a transmitting device 10 and a receiving device 20 configured to implement exemplary embodiments of the present invention. Referring to FIG. 23, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency downconverts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a relay and a base station (BS).

What is claimed is:

1. A method for transmitting control information by a terminal in a wireless communication system, the method comprising:
    receiving a first downlink control information (DCI) for downlink (DL) scheduling, the first DCI including a DL downlink assignment index (DAI);
    receiving a downlink data indicated by the first DCI; and
    transmitting the control information through a physical uplink shared channel (PUSCH), the control information including acknowledgement/negative acknowledgement (ACK/NACK) response about the downlink data,
    wherein the control information is generated based on an uplink (UL) DAI in a second DCI for scheduling the PUSCH, and
    wherein the DL DAI indicates a value related to an accumulated number of DCIs related with downlink scheduling, across a cell group including a plurality of cells, up to a DCI timing corresponding to the first DCI, during a downlink duration.

2. The method of claim 1, wherein the wireless communication system supports more than 5 downlink cells.

3. The method of claim 1, wherein the control information is generated further based on a semi-statically configured maximum number of downlink data which can be scheduled by each DCI for DL scheduling.

4. A method for receiving control information by a base station in a wireless communication system, the method comprising:
    transmitting a first downlink control information (DCI) for downlink, DL, scheduling, the first DCI including a DL downlink assignment index, DAI;
    transmitting a downlink data indicated by the first DCI; and
    receiving the control information through a physical uplink shared channel (PUSCH), the control information including acknowledgement/negative acknowledgement (ACK/NACK) response about the downlink data,
    wherein the control information is generated based on an uplink (UL) DAI in a second DCI for scheduling the PUSCH, and
    wherein the DL DAI indicates a value related to an accumulated number of DCIs related with downlink scheduling, across a cell group including a plurality of cells, up to a DCI timing corresponding to the first DCI, during a downlink duration.

5. The method of claim 4, wherein the wireless communication system supports more than 5 downlink cells.

6. The method of claim 4, wherein the control information is generated further based on a semi-statically configured maximum number of downlink data which can be scheduled by each DCI for DL scheduling.

7. A terminal configured to transmit control information in a wireless communication system, the terminal comprising:
    a radio frequency (RF) unit; and
    a processor configured to control the RF unit,
    wherein the processor is configured to receive a first downlink control information (DCI) for downlink (DL) scheduling, the first DCI including a DL downlink assignment index (DAI),
    receive a downlink data indicated by the first DCI, and
    transmit the control information through a physical uplink shared channel (PUSCH), the control information including acknowledgement/negative acknowledgement (ACK/NACK) response about the downlink data,
    wherein the control information is generated based on a uplink (UL) DAI in a second DCI for scheduling the PUSCH, and
    wherein the DL DAI indicates a value related to an accumulated number of DCIs related with downlink scheduling, across a cell group including a plurality of cells, up to a DCI timing corresponding to the first DCI, during a downlink duration.

8. The terminal of claim 7, wherein the wireless communication system supports more than 5 downlink cells.

9. The terminal of claim 7, wherein the control information is generated further based on a semi-statically configured maximum number of downlink data which can be scheduled by each DCI for DL scheduling.

10. A base station configured to receive control information in a wireless communication system, the base station comprising:
    a radio frequency (RF) unit; and
    a processor configured to control the RF unit,
    wherein the processor is configured to transmit a first downlink control information (DCI) for downlink (DL) scheduling, the first DCI including a DL downlink assignment index (DAI)
    transmit a downlink data indicated by the first DCI, and
    receive the control information through a physical uplink shared channel (PUSCH), the control information including acknowledgement/negative acknowledgement (ACK/NACK) response about the downlink data,
    wherein the control information is generated based on a uplink (UL) DAI in a second DCI for scheduling the PUSCH, and
    wherein the DL DAI indicates a value related to an accumulated number of DCIs related with downlink scheduling, across a cell group including a plurality of cells, up to a DCI timing corresponding to the first DCI, during a downlink duration.

11. The base station of claim 10, wherein the wireless communication system supports more than 5 downlink cells.

12. The base station of claim 10, wherein the control information is generated further based on a semi-statically configured maximum number of downlink data which can be scheduled by each DCI for DL scheduling.

\* \* \* \* \*